(12) United States Patent
Yamazaki et al.

(10) Patent No.: US 11,432,094 B2
(45) Date of Patent: Aug. 30, 2022

(54) THREE-DIMENSIONAL (3D) AUDIO NOTIFICATION FOR VEHICLE

(71) Applicant: SONY GROUP CORPORATION, Tokyo (JP)

(72) Inventors: Ted Yamazaki, San Diego, CA (US); Tonni Larsen, San Diego, CA (US); Leigh Anderson, Novi, MI (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/175,920

(22) Filed: Feb. 15, 2021

(65) Prior Publication Data

US 2022/0116724 A1   Apr. 14, 2022

Related U.S. Application Data

(60) Provisional application No. 63/089,402, filed on Oct. 8, 2020.

(51) Int. Cl.
*H04S 7/00* (2006.01)
*H04R 5/04* (2006.01)
*B60R 11/02* (2006.01)
*H04R 3/12* (2006.01)
*G06V 20/58* (2022.01)

(52) U.S. Cl.
CPC ............ *H04S 7/30* (2013.01); *B60R 11/0217* (2013.01); *G06V 20/58* (2022.01); *H04R 3/12* (2013.01); *H04R 5/04* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 9,896,031 B1 * | 2/2018 | Groh ..................... | B60Q 9/008 |
| 9,956,910 B2 * | 5/2018 | McNew ................. | B60Q 9/008 |
| 10,882,538 B1 * | 1/2021 | Witt ....................... | G01S 15/931 |
| 2011/0199199 A1 * | 8/2011 | Perkins ................. | B60Q 9/008 |
| | | | 340/435 |
| 2013/0093583 A1 * | 4/2013 | Shapiro ................. | G01S 15/931 |
| | | | 340/436 |
| 2016/0188285 A1 * | 6/2016 | Luk ........................ | G06F 3/165 |
| | | | 700/94 |

(Continued)

FOREIGN PATENT DOCUMENTS

CN    110626350 A    12/2019
EP    2168815 A1    3/2010

*Primary Examiner* — Paul W Huber
(74) *Attorney, Agent, or Firm* — Chip Law Group

(57) ABSTRACT

A system including circuitry communicably coupled to a plurality of sensors and a plurality of audio output devices are provided. The circuitry receives a plurality of signals from the plurality of sensors. The circuitry further detects a type of a first object and a position of the first object with respect to a first vehicle based on the received plurality of signals. The circuitry further generates metadata associated with the first object based on the detected type of the first object and the position of the first object. The metadata comprises a first three-dimensional (3D) audio object. The circuitry further controls a first set of audio output devices of the plurality of audio output devices to output the first 3D audio object in a 3D space of the first vehicle at a first time instant.

19 Claims, 9 Drawing Sheets

(56) References Cited

U.S. PATENT DOCUMENTS

2019/0137622 A1* 5/2019 Lopez-Hinojosa ... G01S 13/865
2019/0232863 A1* 8/2019 Rowell ................. B60Q 1/503
2020/0331471 A1* 10/2020 Takahashi ......... B60W 30/0956

* cited by examiner

THREE-DIMENSIONAL (3D) AUDIO NOTIFICATION FOR VEHICLE

CROSS-REFERENCE TO RELATED APPLICATIONS/INCORPORATION BY REFERENCE

This application claims priority to U.S. Provisional Patent Application Ser. No. 63/089,402 filed on Oct. 8, 2020, the entire content of which is hereby incorporated herein by reference.

FIELD

Various embodiments of the disclosure relate to three-dimensional (3D) audio effect for a vehicle. More specifically, various embodiments of the disclosure relate to a system and method for generation and notification of 3D audio for a vehicle.

BACKGROUND

Recent advancements in the field of automobiles have led to various improvements related to vehicles, such as, infotainment systems of the vehicles. However, conventional infotainment systems are designed to merely provide audio or video entertainments to occupants of the vehicle. On the other hand, with an increase in vehicle count ever year, there is a proportionate rise in number of accidents involving vehicles and/obstacles on the road. For example, accidents may occur due to collision with another vehicle approaching from a blind spot of the driver of the vehicle. In another example, accidents may occur due to an obstacle on the road, such as pedestrians or unattended objects on the side of the road. Accidents may further occur due to rash driving by the driver of the vehicle or a momentary lapse of concertation of the driver. Thus, there is a need for a system that may detect potential obstacles on the road, and may further provide non-intrusive and intuitive alerts to the driver of the vehicle to avoid accidents.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for notification of three-dimensional (3D) audio for a vehicle, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
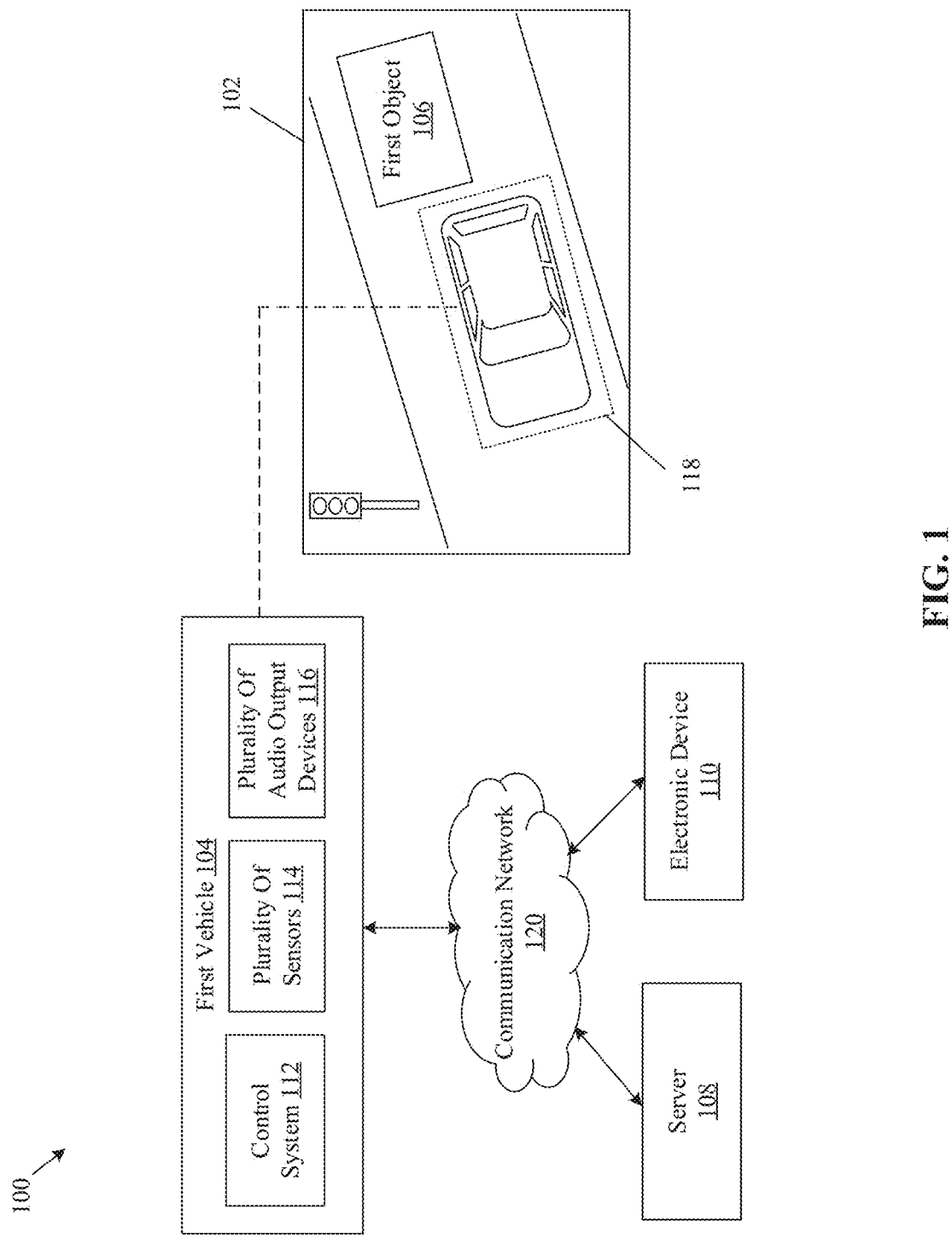
FIG. 1 is a diagram of an exemplary network environment for generation and notification of three-dimensional (3D) audio for a first vehicle, in accordance with an embodiment of the disclosure.

The following described implementations may be found in the disclosed system and method for generation and notification of three-dimensional (3D) audio for a vehicle. Exemplary aspects of the disclosure provide a system (such as a control system) which may be implemented in a vehicle (such as a first vehicle). The system may receive a plurality of signals from a plurality of sensors (such as an image sensor, a light detection and ranging sensor, or an audio sensor) positioned on the first vehicle. The plurality of sensors may generate the plurality of signals based on surroundings of the first vehicle. The system may further detect a type of a first object and a position of the first object with respect to the first vehicle based on the received plurality of signals. For example, the type of the first object may be another moving vehicle which may be approaching the first vehicle from a blind spot of a driver of the first vehicle. In another example, the type of the first object may be an obstacle present in a direction of movement of the first vehicle. Thus, the plurality of sensors may detect any potential obstacle which may potentially cause an incident with the first vehicle.

The system may further generate metadata associated with the first object based on the detected type of the first object and the position of the first object. The metadata may include a 3D audio object and information associated with the first object. For example, the 3D audio object may correspond to a sound alert, such as, an artificial engine sound which may alert a driver of the first vehicle about the approaching vehicle. The system may further provide the 3D audio object as meaningful alerts, such as, verbal notifications about the approaching vehicle or detected obstacle. The verbal notification may indicate information associated with the first object The system may further control a first set of audio output devices of a plurality of audio output devices (such as audio output devices employed in the first vehicle) to output the first 3D audio object in a 3D space of the first vehicle at a first time instant. The system may control the first set of audio output devices to output the first 3D audio object in the 3D space of the first vehicle in such a manner that the sound alerts or the verbal notifications may appear to originate from a direction of the first object, such as, the moving vehicle. Thus, the system may generate 3D audio notifications for obstacles (i.e. stationary or moving objects) that may be present in a blind spot of the driver of the first vehicle or for objects which may be approaching the first vehicle. The system may generate and output 3D audio notifications (such as the sound alerts) originating from the direction of the first object, which may alert the driver about the obstacles in the blind spot of the driver in a non-intrusive and intuitive manner, such that the driver may take necessary precautionary measures to avoid any incident. The system may further generate and output meaningful 3D audio notifications (such as the verbal notifications) about the first object (i.e. another vehicle or obstacles), which may alert the driver based on information associated with the first object (such as the type of the first object, distance from the first object, or a direction on which the first object is located, etc.). The system may further selectively generate and output 3D audio notifications for a specific object among multiple objects detected by the sensors based on an operation of the vehicle (such as lane change by the first vehicle), or based on an intent of the driver.

FIG. 1 is a diagram of an exemplary network environment for generation and notification of three-dimensional (3D) audio for a first vehicle, in accordance with an embodiment of the disclosure. With reference to FIG. 1, there is shown a block diagram of a network environment 100. In the network environment 100, there is further shown a first vehicle 104 and a first object 106 in an example scenario 102. There is further shown a server 108 and an electronic device 110. The first vehicle 104 may define a three-dimensional (3D) space 118. The first vehicle 104 may further include a control system 112 (such as the disclosed system), a plurality of sensors 114 and a plurality of audio output devices 116. In the network environment 100, there is further shown a communication network 120.

In the example scenario 102, there is shown the first vehicle 104 and the surroundings of the first vehicle 104 present in a field of view of one or more sensors of the plurality of sensors 114. The scenario 102 may include objects, such as the first object 106 which may be a second vehicle, stationary objects, such as traffic lights, or pedestrians (not shown) or other animate or inanimate objects. The scenario 102 may further include aerial objects in the vicinity of the first vehicle 104, such as birds or unmanned aerial vehicles (UAVs) (not shown). The scenario 102 may further include sky mobility where the vehicle 104 may be a passenger drone and the first object 106 may be located on an upper side or a lower side of the passenger drone in the sky.

The first vehicle 104 may be a non-autonomous vehicle, a semi-autonomous vehicle, or a fully autonomous vehicle, for example, as defined by National Highway Traffic Safety Administration (NHTSA). Examples of the first vehicle 104 may include, but are not limited to, a two-wheeler vehicle, a three-wheeler vehicle, a four-wheeler vehicle, a hybrid vehicle, an aerial vehicle (e.g. a passenger drone), a watercraft, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The first vehicle 104 may be a system through which a user (such as a driver or an occupant) may travel from a start point to a destination point. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car. The 3D space 118 of the first vehicle 104 may include an interior space of the first vehicle 104, a space between the first vehicle 104 and the first object 106, or a combination of both. It may be noted here that the four-wheeler vehicle (the first vehicle 104) is merely shown as an example in FIG. 1. The present disclosure may be also applicable to other types of vehicles. The description of other types of the vehicle has been omitted from the disclosure for the sake of brevity.

The first object 106 may be a stationary object or a moving object. Examples of the stationary object may include, but are not limited to, a tree, inanimate objects such as a box, a stationary vehicle, a rumble strip, a painted lane strip, a street median, a traffic light signal, or any other obstacle. Examples of the moving object may include, but are not limited to, a moving vehicle, a pedestrian, a bird, or an animal, a cargo drone, a passenger drone, etc.

The server 108 may include suitable logic, circuitry, and interfaces, and/or code that may be configured to acquire information, such as location information of the first vehicle 104. The server 108 may be further configured to provide information, such as emergency warnings and detour information based on the location information of the first vehicle. The server 108 may be configured to communicate with the first vehicle 104 and the electronic device 110 via the communication network 120 to exchange a variety of information such traffic data in a travel route of the first vehicle, user account data associated with a driver of the first vehicle 104, system updates for the control system 112, object identification learning data for identification of objects detected by the sensors 114, and so on. The server 108 may be implemented as a cloud server and may execute operations through web applications, cloud applications, HTTP requests, repository operations, file transfer, and the like. Other example implementations of the server 108 may include, but are not limited to, a database server, a government based server, a global positioning system (GPS) server, a file server, a web server, a media server, an application server, a mainframe server, or a cloud computing server.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the control system 112 as two separate entities. In certain embodiments, the functionalities of the server 108 can be incorporated in its entirety or at least partially in the control system 112, or vice versa, without departing from the scope of the disclosure.

The electronic device 110 may include suitable logic, circuitry, and interfaces that may be configured to perform operations similar to those performed by the control system 112. The electronic device 110 may further provide a user interface for a user, such as the driver of the first vehicle 104 to provide a user input. The electronic device 110 may further be configured to display textual notifications corresponding to the 3D audio objects. The electronic device 110 may be associated with the driver of the first vehicle 104. The electronic device 110 may include an application (downloadable through the server 108) that controls the user interface through which the user may provide user input to the control system 112 and view the displayed textual notifications from the control system 112. Examples of the electronic device 110 may include, but are not limited to, a smartphone, a computing device, a cellular phone, a mobile phone, a gaming device, a mainframe machine, a server, a computer workstation, and/or a consumer electronic (CE) device.

The control system 112 may include suitable logic, circuitry, interfaces, and/or code that may be configured to detect a type of the first object 106 and a position of the first object 106 with respect to the first vehicle 104 using the plurality of sensors 114. The control system 112 may further generate metadata associated with the first object 106, and control a first set of audio output devices of the plurality of audio output devices 116 to output a first 3D audio object in the 3D space 118 of the first vehicle 104. The control system 112 may further include a display device which may display textual notifications associated with the first object 106. In an example, the control system 112 may be specialized electronic circuitry that may be part of an electronic control unit (ECU) to control different functions, such as, but not limited to, engine operations, communication operations, and data acquisition (such as the plurality of signals) of the first vehicle 104, and in-vehicle infotainment hardware and software components of the first vehicle 104. In another example, the control system 112 may be a microprocessor. Other examples of the control system 112 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable consumer electronic (CE) device, a server, and other computing devices. The control system 112 may be included in or integrated with the first vehicle 104 as depicted in FIG. 1. In another embodiment, the control system 112 may be separate from the first vehicle 104.

The plurality of sensors 114 may include suitable logic, circuitry, and interfaces that may be configured to generate a plurality of signals based on detection of one or more objects, such as the first object 106. The plurality of sensors 114 may be positioned at different positions of the first vehicle 104 (as shown, for example, in FIG. 3). Examples of the plurality of sensors 114 may include but are not limited to, an image sensor, a light detection and ranging sensor (LiDAR), an audio sensor, or a location sensor. Details of the types of plurality of sensors 114 and the position of the plurality of sensors 114 on the first vehicle 104 are further described, for example, in FIG. 3.

The plurality of audio output devices 116 may include suitable logic, circuitry, and interfaces that may be configured to output a 3D audio object in the 3D space 118 of the first vehicle 104. The plurality of audio output devices 116 may be configured to output the 3D audio object as a virtual sound source in the 3D space 118, which may give the impression to the occupant of the first vehicle 104 that the 3D audio object originates from a position different from the positions of the plurality of audio output devices 116. The 3D audio object may be output as a virtual sound source based on sound localization techniques, such as, head-related transfer function (HRTF), details of which are further described, for example, in FIG. 4. The plurality of audio output devices 116 may be positioned at different positions of the first vehicle 104 (shown for example in FIG. 3), and may be configured to produce sound using multiple audio channels within the 3D space 118 of the first vehicle 104. For example, the plurality of audio output devices 116 may be mounted on a dashboard of the first vehicle 104, doors of the first vehicle 104, interior roof of the first vehicle 104, headrest of a seat of the first vehicle 104, or a helmet, etc. Examples of the plurality of audio output devices 116 may include but are not limited to, component speakers, coaxial speakers, a loudspeaker, an actuator, and in-vehicle stereo systems.

The communication network 120 may include a communication medium through which the first vehicle 104, the server 108, and the electronic device 110 may communicate with each other. The communication network 120 may be one of a wired connection or a wireless connection Examples of the communication network 120 may include, but are not limited to, the Internet, a cloud network, a Wireless Fidelity (Wi-Fi) network, a Personal Area Network (PAN), a Local Area Network (LAN), a Metropolitan Area Network (MAN), or a satellite communication network (such as a satellite constellation). Various devices in the network environment 100 may be configured to connect to the communication network 120 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the first vehicle 104 may be travelling on a road, as shown in the scenario 102. The system (such as the control system 112) in the first vehicle 104 may be configured to receive the plurality of signals from the plurality of sensors 114. The plurality of sensors 114 may be positioned at different positions on the first vehicle 104. The plurality of signals may correspond to detection of the surroundings of the first vehicle 104. The detection result of the plurality of sensors 114 may be output as the plurality of signals. For example, the plurality of signals may include a detection signal corresponding to a geographical location of the first vehicle 104, and a detection signal corresponding to an obstacle, such as, the first object 106 which may be present in a blind spot of the first vehicle 104. In one or more embodiments, one or more signals may be received from the server 108 (for example, a GPS server) for determination of the geographical location of the first vehicle 104. Details of the reception of the plurality of signals are further described, for example, in FIG. 3.

The control system 112 may further detect a type of the first object 106 based on the received plurality of signals. In some embodiments, the type of the first object 106 may be one of a stationary object (such as a pile of boxes) or a moving object (such as a second vehicle). The control system 112 may further detect a position of the first object 106 with respect to the first vehicle 104 based on the received plurality of signals. For example, the control system 112 may further detect the position of the first object 106 to be at a right rear end of the first vehicle 104. Details of the detection of the type of the first object 106 and the position of the first object 106 are further described for example, in FIG. 4.

The control system 112 may further generate metadata associated with the first object 106 based on the detected type of the first object 106 and the position of the first object 106. The metadata may include a first 3D audio object and information associated with or about the first object 106. For example, the first 3D audio object may correspond to a sound alert or a verbal notification, based on the detected type of the first object 106 and the position of the first object 106. As part of the metadata, the first 3D audio object may include multiple sound parameters (such as, a type of sound, volume, depth, direction, channel information, parameters related to HRTF, etc.) for reproduction of the first 3D audio object in the 3D space 118. In case the first 3D audio object corresponds to the verbal notification, the first 3D audio object may further indicate the information associated with the first object 106 (such as the type of the first object 106, distance from the first object 106, or a direction on which the first object 106 is located, etc.) along with the sound parameters for the reproduction of the first 3D audio object. In one or more embodiments, the control system 112 may generate textual notifications corresponding to the verbal notification. In some embodiments, the information associated with the first object 106 may include at least one of the detected type of the first object 106, a direction of the position of the first object 106 with respect to the first vehicle 104, a distance of the first object 106 from the first vehicle 104, a size of the first object 106, or a side of the first vehicle 104 on which the first object 106 is located. Details of the generation of the metadata are further described for example, in FIG. 4 and FIG. 6A.

Figure 3:
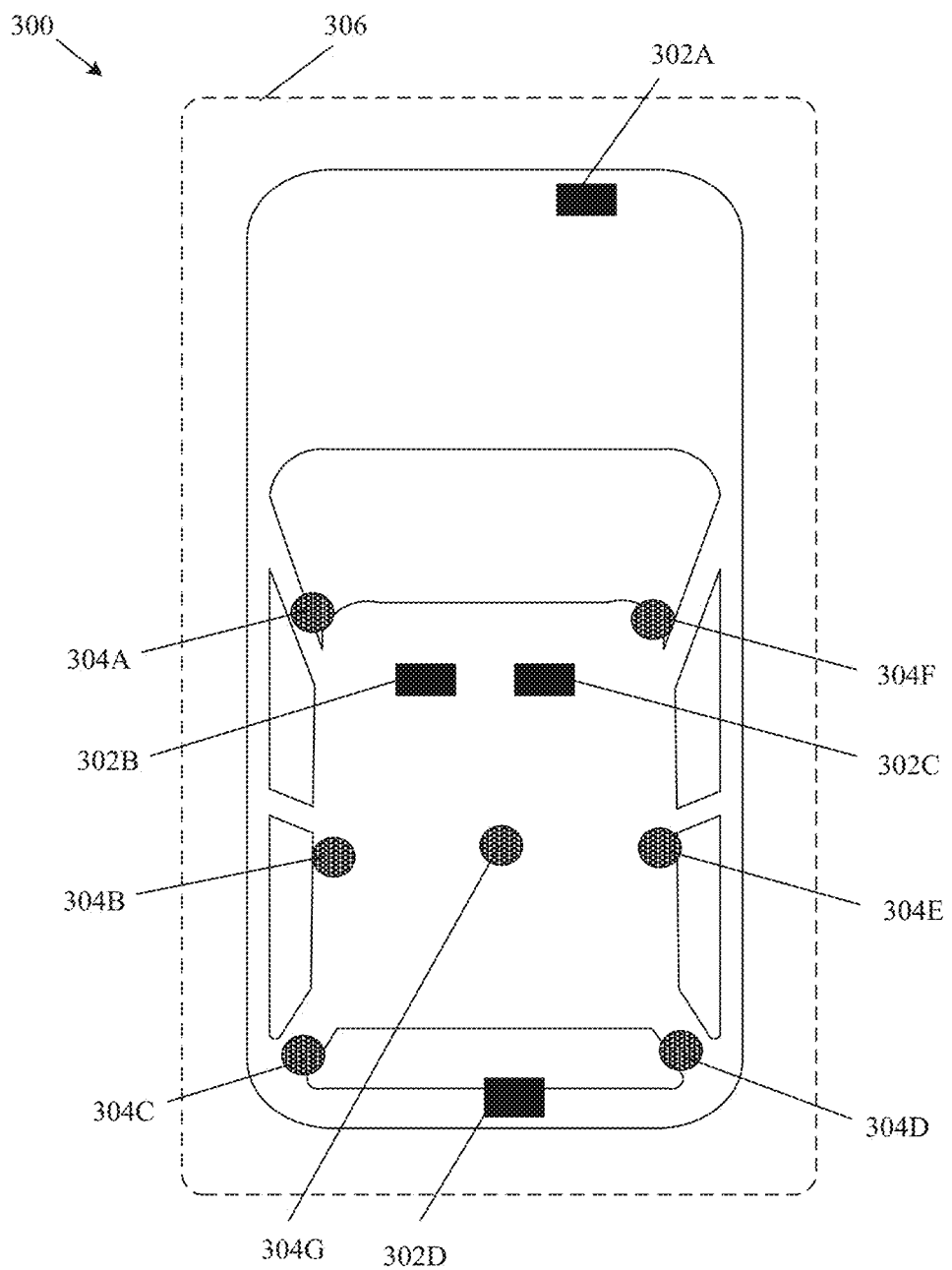
FIG. 3 is an exemplary diagram that illustrates a configuration of a plurality of sensors and a plurality of audio output devices in the first vehicle, in accordance with an embodiment of the disclosure.

The control system 112 may further be configured to control a first set of audio output devices of the plurality of audio output devices 116 to output the first 3D audio object in the 3D space 118 of the first vehicle 104 at a first time instant. The plurality of audio output devices 116 may be positioned at different positions in the first vehicle 104, as depicted in FIG. 3. The control system 112 may select the first set of audio output devices based on the detected position of the first object 106 with respect to the first vehicle 104. Details of the control of the first set of audio output devices are further described for example, in FIG. 4.

In accordance with an embodiment, the control system 112 may be configured to control the first set of audio output devices to output the first 3D audio object as a virtual sound source in the 3D space 118. The control system 112 may switch from the first set of audio output devices to a second set of audio output devices of the plurality of audio output devices 116 to continuously change a position and volume of the virtual sound source in the 3D space 118, thereby providing a 3D audio experience inside the first vehicle 104. The position and the volume of the virtual sound source is changed based on a change in the position of the first object 106 with respect to the first vehicle 104. Details of the change in the position and the volume of the virtual sound source are further described for example, in FIGS. 5A and 5B.

In accordance with an embodiment, the control system 112 may be configured to detect presence of a second object. The control system 112 may be further configured to detect a type of the second object and a position of the second object with respect to the first vehicle 104. The control system 112 may generate the metadata (which includes a second 3D audio object) based on the detection of the type of the second object and the position of the second object with respect to the first vehicle 104. The control system 112 may further control the plurality of audio output devices 116 to sequentially output the first 3D audio object at the first time instant and the second 3D audio object at a second time instant, based on a time synchronization between the first 3D audio object and the second 3D audio object. Details of the sequential output the first 3D audio object and the second 3D audio object are further described for example, in FIG. 6A.

In accordance with an embodiment, in a case where the first object 106 may be a lane strip or a rumble strip, the control system 112 may be configured to generate the first 3D audio object when the first vehicle 104 changes a lane. The control system 112 may further control the first set of audio output devices of the plurality of audio output devices 116 to output the first 3D audio object in the 3D space 118 of the first vehicle 104, based on detection of the lane change by the first vehicle 104. Details of the output the first 3D audio object corresponding to lane change are further described for example, in FIG. 7.

Therefore, the system (such as the control system 112) of the present disclosure may control the plurality of audio output devices 116 in the first vehicle 104 to output the 3D audio notifications in a manner that the sound alerts or the verbal notifications may appear to be originating from a direction of the first object 106. Thus, the control system 112 may generate and control output of 3D audio notifications for obstacles that may be present in a blind spot of the driver of the first vehicle 104 or for objects which may be approaching the first vehicle 104. The control system 112 may generate 3D audio notifications (such as the sound alerts) originating from the direction of the first object 106, which may alert the driver of the obstacles in the blind spot of the driver in a non-intrusive and intuitive manner, such that the driver may take necessary precautionary measures to avoid accidents. In case the first vehicle 104 is an aerial drone (e.g. passenger aerial drone), the control system 112 may generate 3D audio notifications (such as the alerts), originating from the bottom of the first vehicle 104, corresponding to a height of the aerial drone from a ground surface based on signals from the sensors 114 (e.g. altimeter). Thus, the system further provides alerts for navigation of the first vehicle 104, such that the occupant may intuitively recognize a direction of travel for safe driving of ground, aerial, or waterborne vehicles. The system may further generate meaningful 3D audio notifications (such as the verbal notifications), which may alert the driver of the obstacles based on the information associated with the first object 106 (such as the type of the first object 106, distance from the first object 106, or a direction on which the first object 106 is located, etc.). The system may further selectively generate 3D audio notifications for a specific object among multiple objects detected by the sensors 114 based on an operation of the vehicle by the driver of the vehicle (such as lane change by the first vehicle), such that the 3D audio notifications are generated based on an operation or intent of the driver.

The control system 112 may further control a display device (shown in FIG. 2) to generate the textual notifications which may provide alerts to the driver in an effective manner. Thus, the control system 112 may provide meaningful multimodal notifications, which may be utilized by the driver of the first vehicle 104 to remain alert and safely travel in the first vehicle 104.

Figure 2:
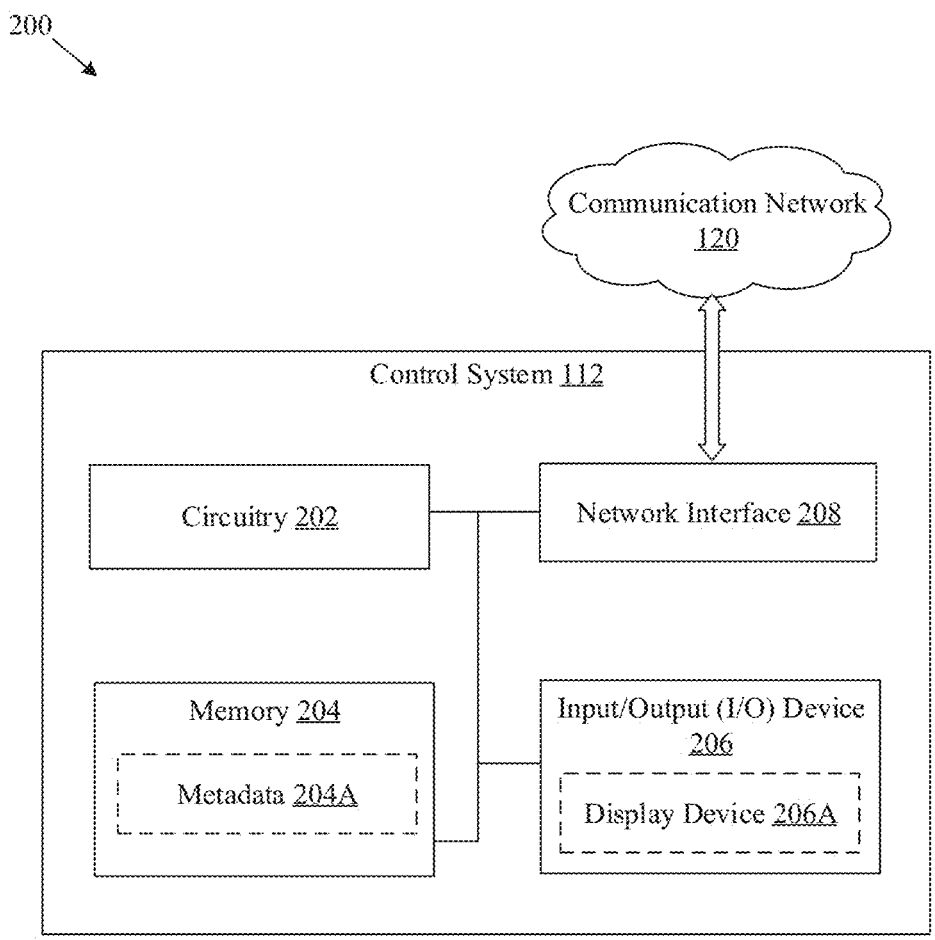
FIG. 2 is a block diagram of a control system for generation and notification of the 3D audio for the first vehicle, in accordance with an embodiment of the disclosure.

FIG. 2 is a block diagram of a control system for generation and notification of the 3D audio for the first vehicle, in accordance with an embodiment of the disclosure. FIG. 2 is explained in conjunction with elements from FIG. 1. With reference to FIG. 2, there is shown a block diagram 200 of the control system 112. The control system 112 may include circuitry 202 and a memory 204. The memory 204 may include metadata 204A. The control system 112 may further include an input/output (I/O) device 206 which may include a display device 206A. The control system 112 may further include a network interface 208.

The circuitry 202 may include suitable logic, circuitry, and interfaces that may be configured to execute program instructions associated with different operations to be executed by the control system 112. For example, some of the operations may include detection of the type of the first object 106 and the position of the first object 106 with respect to the first vehicle 104, and generation of the metadata 204A associated with the first object 106. The circuitry 202 may be further configured to control the first set of audio output devices of the plurality of audio output devices 116 to output the first 3D audio object in the 3D space 118 of the first vehicle 104 at the first time instant. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and interfaces that may be configured to store the one or more instructions to be executed by the circuitry 202. The memory 204 may be configured to store the metadata 204A. The memory 204 may be further configured to store a variety of data received from the server 108 via the network interface 208. The data received from the server 108 may include traffic data in a travel route of the first vehicle 104, user account data associated with a driver of the first vehicle 104, system configuration/software updates for the control system 112, object identification learning data, etc. The memory 204 may be further configured to store the plurality of signals received from the plurality of sensors 114 and the user input received from the user of the first vehicle 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The metadata 204A may include the first 3D audio object and information associated with the first object 106. In some embodiments, the first 3D audio object may correspond to a sound alert or a verbal notification associated with the first object 106. The information associated with the first object 106 may include, for example, the detected type of the first object 106, a direction of the position of the first object 106 with respect to the first vehicle 104, a distance of the first object 106 from the first vehicle 104, a size of the first object 106, or a side of the first vehicle 104 on which the first object 106 is located, etc. As part of the metadata, the first 3D audio object may further include information about multiple sound parameters (such as, volume, a type of sound, depth based on volume, direction, channel information, parameters related to HRTF, etc.) and their respective values for reproduction of the first 3D audio object in the 3D space 118. In case the first 3D audio object corresponds to the verbal notification, the first 3D audio object may further indicate the information associated with the first object 106 (such as the type of the first object 106, distance from the first object 106, or a direction on which the first object 106 is located, etc.) for synthesizing speech sound for the verbal notification. The information associated with the first object 106 may be used to generate textual notifications corresponding to the verbal notifications. In an embodiment, the information associated with the first object 106 may include a Uniform Resource Locator (URL) associated with the first object 106, which may be accessed to obtain additional information associated with the first object 106.

The I/O device 206 may include suitable logic, circuitry, and interfaces that may be configured to receive a user input from the user (such as the driver of the first vehicle 104) and provide an output based on the received input. The user input may correspond to a selection of a type of the sound alert among a plurality of types of sound alerts for each type of the first object 106. The output may correspond to the textual notifications associated with the verbal notifications. The I/O device 206 which may include various input and output devices, may be configured to communicate with the circuitry 202. Examples of the I/O device 206 may include, but are not limited to, a touch screen, a keyboard, a mouse, a joystick, a microphone, a display device, and a speaker.

The display device 206A may include suitable logic, circuitry, and interfaces that may be configured to receive the user input and display the textual notifications associated with the verbal notifications. The display device 206A may be a touch screen which may enable a user to provide touch-based input via the display device 206A. The touch screen may be at least one of a resistive touch screen, a capacitive touch screen, or a thermal touch screen. The display device 206A may be realized through several known technologies such as, but not limited to, at least one of a Liquid Crystal Display (LCD) display, a Light Emitting Diode (LED) display, a plasma display, or an Organic LED (OLED) display technology, or other display devices. In some embodiments, the display device 206A may refer to a display screen of a head mounted device (HMD), a smart-glass device, a see-through display, a projection-based display, an electro-chromic display, or a transparent display.

The network interface 208 may include suitable logic, circuitry, and interfaces that may be configured to facilitate communication between the control system 112 in the first vehicle 104, the server 108, and the electronic device 110, via the communication network 120. The network interface 208 may be further configured to facilitate communication between the control system 112 and the native electronic control unit (not shown) of the first vehicle 104 to receive various data related to the operation of the first vehicle 104, such as, activation of the indicator lights, rotational angle of the steering wheel, a speed of the first vehicle 104, a position of the gearshift, etc.). The network interface 208 may be implemented by use of various known technologies to support wired or wireless communication of the control system 112 with the communication network 120. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), a metropolitan area network (MAN), and a satellite communication network (such as a satellite constellation). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

FIG. 3 is an exemplary diagram that illustrates a configuration of a plurality of sensors and a plurality of audio output devices in the first vehicle, in accordance with an embodiment of the disclosure. FIG. 3 is described in conjunction with elements from FIGS. 1 and 2. With reference to FIG. 3, there is shown a first vehicle 300. The configuration and functionalities of the first vehicle 300 may be same as the configuration and functionalities of the first vehicle 104 described, for example, in FIG. 1. Therefore, the description of the first vehicle 300 is omitted from the disclosure for the sake of brevity.

The first vehicle 300 may include a plurality of sensors 302A-302D and a plurality of audio output devices 304A-304G. The first vehicle 300 may further define a 3D space 306. In accordance with an embodiment, the plurality of sensors 302A-302D may be positioned at different positions on the first vehicle 300. The plurality of sensors 302A-302D may include at least one of an image sensor, a light detection and ranging (LiDAR) sensor, an audio sensor, a radio detection and ranging (RADAR) sensor, a location sensor, an ultrasonic sensor, or a microphone. For example, a first sensor 302A of the plurality of sensors 302A-302D may be a first RADAR sensor, which may be positioned towards, for example, a front end of the first vehicle 300. A second RADAR sensor may further be positioned towards a rear end of the first vehicle 300. The first sensor 302A may be utilized to monitor objects, such as other vehicles surrounding the first vehicle 300. Thus, the first sensor 302A may be utilized for the detection of the first object 106. In some embodiments, the first sensor may be a LiDAR sensor which may be positioned at the roof of the first vehicle 300. The LiDAR sensor may be configured to measure the distance of the first object 106 from the first vehicle 300 by illuminating the first object 106 with light (e.g. laser light) and by measuring return times and wavelengths of the reflected light.

A second sensor 302B of the plurality of sensors 302A-302D may be the image sensor (such as a camera), which may be positioned at a front bumper, a rear bumper, or a roof of the first vehicle 300. In some embodiments, one or more image sensors may further be positioned in an interior portion or at an exterior portion of the first vehicle 300. In another example, the second sensor 302B may be either a single wide field-of-view camera or multiple wide field-of-view cameras (such as a 360-degree camera or a spherical camera) mounted on the body of the first vehicle 300. The wide field-of-view camera may capture a 360 degree image or a spherical image around the first vehicle 300 in X-axis, Y-axis and Z-axis directions, and thus concurrently capture multiple objects around the first vehicle 300. Based on the position and viewpoint of the second sensor 302B (such as the camera), the camera may capture an overhead image, a vehicle travel direction image, a vehicle lateral side image, a rear direction image, etc. The second sensor 302B may be configured to generate one or more images based on the captured objects, such as the stationary objects and the moving objects around the first vehicle 300. For example, an image of the first object 106 may be captured by the second sensor 302B. In an embodiment, the image captured by the second sensor 302B may be subjected to image segmentation for detection and identification of the first object 106.

A third sensor 302C of the plurality of sensors 302A-302D may be the location sensor, which may be integrated with the native electronic control unit (not shown) of the first vehicle 300, or may be a standalone sensor. The location sensor may be utilized to record a current geographic location of the first vehicle 300.

A fourth sensor 302D of the plurality of sensors 302A-302D may be the ultrasonic sensor or the microphone which may be positioned at the rear end of the first vehicle 300. For example, the fourth sensor 302D may be used to determine a distance between the rear end of the first vehicle 300 and the first object 106, such as a wall or a pile of boxes which may be located in a blind spot of the driver of the first vehicle 300. In some embodiments, the fourth sensor 302D may be an image sensor to determine the distance between the rear end of the first vehicle 300 and the first object 106. Furthermore, the first vehicle 300 may include sensors, such as the audio sensors positioned at different positions in the first vehicle 300. It may be noted that positions of the plurality of sensors 302A-302D shown in FIG. 3 are merely illustrative of an example, and one or more of the plurality of sensors 302A-302D may be positioned at other positions on the first vehicle 104 (such as on rear-view mirrors, wing mirrors, or chassis of the first vehicle 104) based on performance requirement and other factors, without departing from scope of the disclosure.

The plurality of audio output devices 304A-304G may be positioned at different positions on the first vehicle 300. For example, a first audio output device 304A may be positioned at a front left side door of the first vehicle 300 or the left hand side of the dashboard of the first vehicle 300. A second audio output device 304B may be positioned at a rear left side door of the first vehicle 300. A third audio output device 304C may be positioned at a left side rear end of the first vehicle 300. A fourth audio output device 304D may be positioned at a right side rear end of the first vehicle 300. A fifth audio output device 304E may be positioned at a rear right side door of the first vehicle 300. A sixth audio output device 304F may be positioned at a front right side door of the first vehicle 300 or the right hand side of the dashboard of the first vehicle 300. A seventh audio output device 304G may be positioned at an interior portion of the roof of the first vehicle 300. In one or more embodiments, one or more audio output devices (not shown in FIG. 3) may be positioned at the interior portion of a bottom of the first vehicle 300. In another example, the plurality of audio output devices 304A-304G may be positioned in the seat of the first vehicle 300 or near the head of the occupant of the first vehicle 300, and may include a headrest speaker, a headrest actuator, or a helmet speaker. It may be noted that positions of the plurality of audio output devices 304A-304G shown in FIG. 3 are merely illustrative of an example, and one or more of the plurality of audio output devices 304A-304G may be positioned at other positions in the first vehicle 104 based on performance requirement and other factors, without departing from scope of the disclosure.

The control system 112 may be configured to control the plurality of audio output devices 304A-304G to output the first 3D audio object in the 3D space 306 of the first vehicle 300 at a first time instant. In an embodiment, the 3D space 306 may correspond to an interior space of the first vehicle 300. In some embodiments, the control system 112 may control a first set of audio output devices of the plurality of audio output devices 304A-304G to output the first 3D audio object, based on the type of the first object 106 and the position of the first object 106 with respect to the first vehicle 300. For example, the control system 112 may control the fourth audio output device 304D and the fifth audio output device 304E to output the first 3D audio object, when the first object 106 is present and/or detected near the right side rear end of the first vehicle 300. The number of plurality of audio output devices 304A-304G shown in FIG. 3 is presented merely as an example. The plurality of audio output devices 304A-304G may include one audio output device or more than seven audio output devices for output of the 3D audio object, without departing from the scope of the disclosure. For the sake of brevity, a limited number of audio output devices (the plurality of audio output devices 304A-304G) have been shown in FIG. 3. However, in some embodiments, the number of audio output devices may be more than seven, without limiting the scope of the disclosure.

Figure 4:
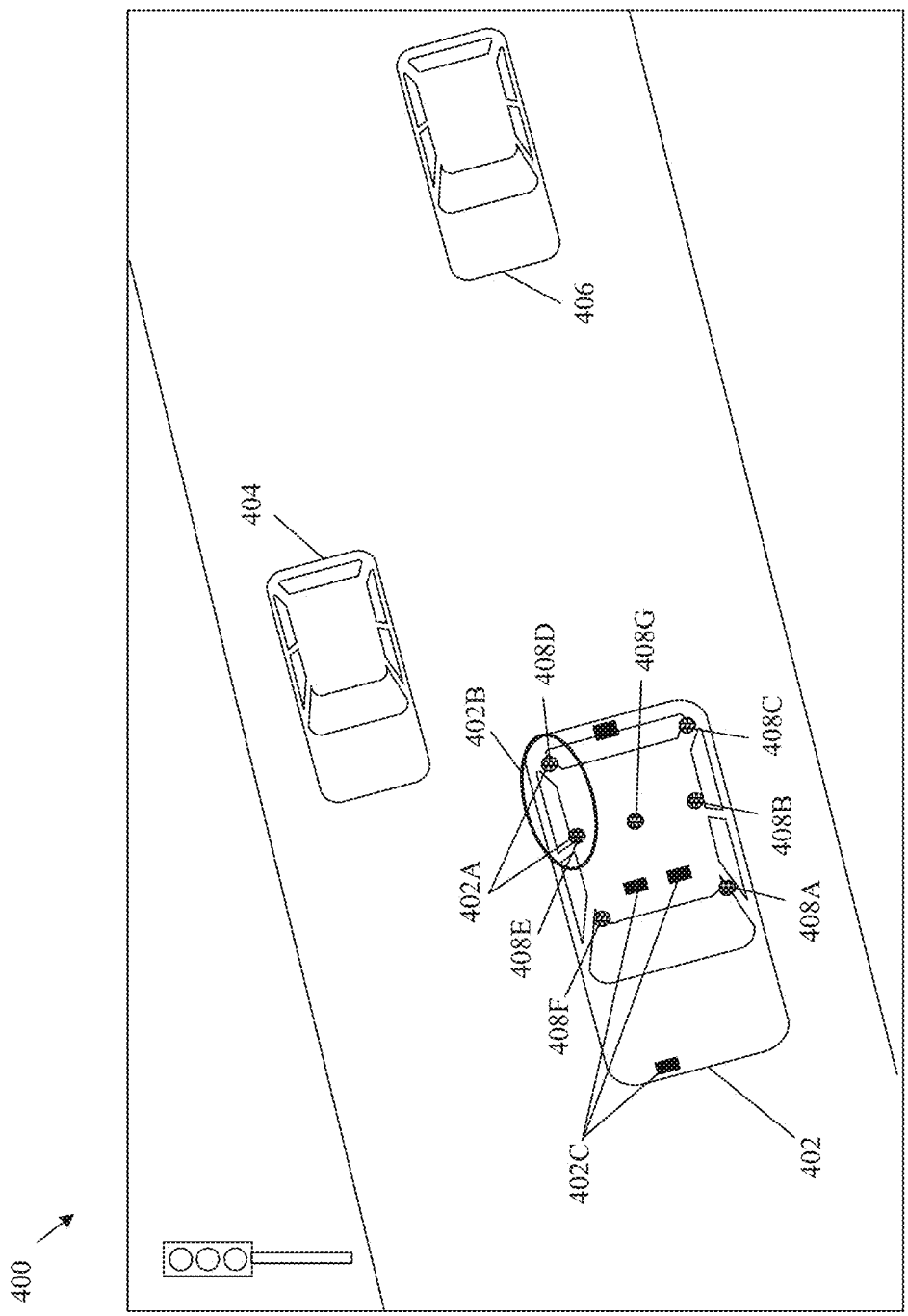
FIG. 4 is a diagram that illustrates an exemplary scenario for the generation and notification of the 3D audio associated with a first object for the first vehicle, in accordance with an embodiment of the disclosure.

FIG. 4 is a diagram that illustrates an exemplary scenario for the generation and notification of the 3D audio associated with a first object for the first vehicle, in accordance with an embodiment of the disclosure. FIG. 4 is described in conjunction with elements from FIGS. 1, 2, and 3. With reference to FIG. 4, there is shown a scenario 400. In the scenario 400, there is shown a first vehicle 402, a first object 404, and a second object 406. The first vehicle 402 may further include a plurality of sensors 402C and a plurality of audio output devices 408A-408G. The functionalities of the plurality of sensors 402C may be same as the functionalities of the plurality of sensors 302A-302D described, for example, in FIG. 3. Therefore, the description of the plurality of sensors 402C is omitted from the disclosure for the sake of brevity. The functionalities of the plurality of audio output devices 408A-408G may be same as the functionalities of the plurality of audio output devices 304A-304G described, for example, in FIG. 3. Therefore, the description of the plurality of audio output devices 408A-408G is omitted from the disclosure for the sake of brevity.

In the scenario 400, the first vehicle 402 may be moving on a road. The first vehicle 402 may include the control system 112. The circuitry 202 of the control system 112 may be configured to receive the plurality of signals from the plurality of sensors 402C of the first vehicle 402. The plurality of sensors 402C may generate the plurality of signals based on detection of the surroundings of the first vehicle 402. For example, the surroundings of the first vehicle 402 may include the first object 404 and the second object 406. The plurality of signals may correspond to the geographical location of the first vehicle 402, a speed of the first vehicle 402, and signals corresponding to the detected objects, such as the first object 404 and the second object 406 in the surroundings of the first vehicle 402.

The circuitry 202 may further detect the type of the first object 404 and the position of the first object 404 with respect to the first vehicle 402 based on the received plurality of signals. In some embodiments, the circuitry 202 may further detect the type of the second object 406 and the position of the second object 406 with respect to the first vehicle 402 based on the received plurality of signals. In accordance with an embodiment, the detected type of the first object 404 and the second object 406 may be a second vehicle, a rumble strip, a street median, a pedestrian, or an obstacle. In an exemplary scenario, the circuitry 202 may employ image segmentation and object recognition techniques (using the object identification learning data stored in the memory 204) to detect the type of the first object 404 and the position of the first object 404 with respect to the first vehicle 402 based on the received plurality of signals. In an example, the circuitry 202 may receive the plurality of signals corresponding to captured images of the surroundings of the first vehicle 402 including the first object 404 and second object 406.

In an embodiment, the circuitry 202 may execute object detection techniques (using the object identification learning data stored in the memory 204) to detect the type of objects (such as the first object 404 and the second object 406) included in the captured images. The circuitry 202 may be configured to acquire sample images for each type of object from the server 108, and store the sample images to detect the type of the first object 404 and the second object 406. In some embodiments, the circuitry 202 may store a neural network model (not shown) which is trained using training data acquired from the server 108, to classify the object into different types (such as vehicle, pedestrian, tree, building, etc.). In another example, the circuitry 202 may be configured to determine the speed of the first object 404 (such as the vehicle) based on the capture of multiple images of the first object 404 over a period of time. In case the first vehicle 402 is moving, the circuitry 202 may be configured to determine the speed of the first object 404 based on the speed of the first vehicle 402. Based on the pixel information of first object 404 in the captured image, and a position of the image sensor 402C that outputs the captured image, the circuitry 202 may also determine the position and the distance of the first object 404 with respect to the first vehicle 402.

In the scenario 400, the type of the detected first object 404 may be a second vehicle, such as a car which may be moving on the road. The first object 404 may be at a position which is near the right rear end of the first vehicle 402. The second object 406 may be a third vehicle moving on the road. The position of the second object 406 may be behind the first vehicle 402 on the road.

The circuitry 202 may be further configured to generate the metadata 204A associated with the first object 404 based on the detected type of the first object 404 and the position of the first object 404 with respect to the first vehicle 402. The metadata 204A may include the first 3D audio object 402B and the information associated with the first object 404. In accordance with an embodiment, the information associated with the first object 404 may include at least one of the detected type of the first object 404 (e.g. car, pedestrian, a pile of boxes), a direction of the position of the first object 404 with respect to the first vehicle 402 (e.g. front left, rear left, front right, left right, etc.), a distance of the first object 404 from the first vehicle 402 (e.g. few feet behind the rear bumper), a size of the first object 404, or a side of the first vehicle 402 on which the first object 404 is located (e.g. left side, right side, driver side, passenger side, etc.). In an example, the information associated with the first object 404 may include that the type of the first object 404 may be "a moving car", the direction of the position of the first object 404 may be "a right side rear end of the first vehicle 402", the side of the first vehicle 402 on which the first object 404 is located may be "a right side of the first vehicle 402", and the distance of the first object 404 may be "3 feet from the first vehicle 402". Therefore, the generated 3D audio object may include the information (e.g. in audio reproducible form) about the detected first object 404 (such as type as "moving car", direction as "right side of the first vehicle 402", and/or distance as "3 feet from the first vehicle 402") and include information about the position of the first object 404 (such as "right side rear end of the first vehicle 402").

In one or more embodiments, the generation of the metadata 204A associated with the second object 406 may be omitted based on a distance between the first vehicle 402 and the second object 406. In the scenario 400, the first vehicle 402 and the second object 406 may be at a safe distance (for example, equal to or more than two meters) from each other at a first time instant, and thus, the circuitry 202 may generate the metadata 204A for the first object 404 which may be at a predefined distance or less (for example, five feet) from the first vehicle 402.

In another embodiment, the generated metadata 204A may include an identifier of selected first set of audio output devices 402A of the plurality of audio output devices 408A-408G from which the 3D audio object is to be reproduced. The circuitry 202 may be configured to select the first set of audio output devices 402A based on the position of the first object 404 with respect to the driver of the first vehicle 402.

The circuitry 202 may be further configured to control the first set of audio output devices 402A (which may correspond to an audio output device 408D and an audio output device 408E) of the plurality of audio output devices 408A-408G to output the generated first 3D audio object 402B in a 3D space (such as the 3D space 306) of the first vehicle 402 at the first time instant. It is to be noted that the oval that depicts the first 3D audio object 402B in FIG. 4 is a symbolic representation of the first 3D audio object 402B output by one or more of the plurality of audio output devices 408A-408G. The control of the first set of audio output devices 402A of the plurality of audio output devices 408A-408G may be based on the detected type and the detected position of the first object 404 with respect to the first vehicle 402. For example, the circuitry 202 may be configured to extract the metadata 204A associated with the first object 404 (including the information associated with the first object 404 and the identifier of the first set of audio output devices 402A), and reproduce the first 3D audio object 402B in audio form via the first set of audio output devices 402A.

In accordance with an embodiment, the circuitry 202 may be configured to control the first set of audio output devices 402A to output the first 3D audio object 402B as a virtual sound source in the 3D space 306. The 3D space 306 may include at least one of an interior space of the first vehicle 402 or a space between the first vehicle 402 and the first object 404. The circuitry 202 may further control the position of the virtual sound source to correspond to one of the interior space of the first vehicle 402 or the space between the first vehicle 402 and the first object 404. The virtual sound source corresponding to the first 3D audio object 402B may be output by the first set of audio output devices 402A in the 3D space 306 so as to allow the driver of the first vehicle 402 to intuitively and aurally recognize a proximity (e.g. by a depth of the first 3D audio object 402B based on volume of the first 3D audio object 402B) and a position (e.g. based on output direction of the first 3D audio object 402B) of the first object 404 with respect to the first vehicle 402. Thus, the virtual sound source corresponding to the first 3D audio object 402B may enable the driver to take precautionary measures to avoid any accidents that may occur due to the first object 404.

For example, the circuitry 202 may further control the first set of audio output devices 402A using, for example, parameters related to HRTF, such that the virtual sound source appears to be located at a position that is midpoint between the actual positions of the audio output device 408D and the audio output device 408E. The circuitry 202 may employ HRTF (or other 3D sound localization techniques for sound reconstruction) to determine the energy of a signal for driving each of the first set of audio output devices 402A, such that the resulting sound (e.g. first 3D audio object 402B) output by the first set of audio output devices 402A is a 3D sound with directionality. In one embodiment, the origination position of the virtual sound source may be determined based on the relative positions of the driver of the first vehicle 402 and the first object 404. In an embodiment, the HRTF may be determined for one or more HRTF filters associated with each of the first set of audio output devices 402A. The circuitry 202 may be configured to determine one or more parameters associated with the one or more HRTF filters, based on a listening position of the driver of the first vehicle 402 and the positions of each of the first set of audio output devices 402A within the 3D space. The circuitry 202 may then control the application of the HRTF on the first set of audio output devices 402A based on the determined one or more parameters to control reproduction of the first 3D audio object 402B. The circuitry 202 may further control different sound parameters of the first set of audio output devices 402A, such as, volume, direction, channel information, a type of sound (e.g. engine sound, rumble strip sound, synthesized speech sound, nature sound, etc.) of the first 3D audio object 402B output by the first set of audio output devices 402A.

In accordance with an embodiment, the circuitry 202 may be configured to output the first 3D audio object 402B as at least one of a sound alert or a verbal notification. The sound alert may correspond to at least one of an artificial engine sound, an artificial rumble sound, a vehicle horn sound, or a nature sound, based on the type of the first object 404. In accordance with an embodiment, the type of the first object 404 may be a stationary object or a moving object. The circuitry 202 may be configured to output the first 3D audio object 402B as the sound alert in case the type of the first object 404 is the moving object. In some embodiments, the circuitry 202 may be further configured to control a type of sound of the first 3D audio object 402B based on the detected type of the first object 404. The circuitry 202 may be further configured to control a direction of sound of the first 3D audio object 402B based on the detection of the position of the first object 404. For example, the first 3D audio object 402B may be output as an artificial engine sound originating from the direction of the first set of audio output devices 402A, based on the detection that the first object 404 may be a moving vehicle approaching from the rear right side of the first vehicle 402. Thus, the first 3D audio object 402B output as the engine sound by the first set of audio output devices 402A, may aurally alert the driver of the first vehicle 402 about the first object 404 (e.g. moving vehicle) in the blind spot of the driver so as to identify the first object 404 as a potential obstacle or as an approaching or nearby vehicle.

In an embodiment, the circuitry 202 may control the volume of the first 3D audio object 402B (output, for example, as the engine sound reproduced by the first set of audio output devices 402A) to be lower when the distance between the first vehicle 402 and the first object 404 (e.g. moving vehicle) is larger. The circuitry 202 may control the volume of the first 3D audio object 402B (output, for example, as the engine sound) to increase when the first object 404 approaches the first vehicle 402, and the distance between the first vehicle 402 and the first object 404 reduces. In an embodiment, the circuitry 202 may change the type of sound of the first 3D audio object 402B from the artificial engine sound to a verbal notification (e.g. a warning message such as "a big blue truck approaching from right rear side") in case the first object 404 approaches closer to the first vehicle 402, or in case the first vehicle 402 sways in the direction of the approaching first object 404 in the blind spot of the driver.

Furthermore, the verbal notification may correspond to a synthesized speech sound. The synthesized speech sound may be for example, a voice of a human. The verbal notification may include an indication of at least one of the detected type of the first object 404, the direction of the position of the first object 404 with respect to the first vehicle 402, the distance of the first object 404 from the first vehicle 402, the size of the first object 404, the side of the first vehicle 402 on which the first object 404 is located, or a visual characteristic (such as shape or color) of the first object 404. The circuitry 202 may be configured to control the first set of audio output devices 402A of the plurality of audio output devices 408A-408G to output the first 3D audio object 402B as the verbal notification in case the type of the first object 404 is the stationary object. Details of output of the first 3D audio object 402B as the verbal notification are further described for example, in FIGS. 6A and 6B. It may be noted that the output of the first 3D audio object 402B as the verbal notification in case the type of the first object 404 is the stationary object and the output of the first 3D audio object 402B as the sound alert in case the type of the first object 404 is the moving object, is presented merely as an example. Accordingly, in some embodiments, other types of the first 3D audio object 402B for different types of the first object 404 may be employed, without departing from scope of the disclosure.

In accordance with an embodiment, the circuitry 202 may be further configured to control a second set of output audio devices (e.g. the audio output device 408E and the audio output device 408F) of the plurality of audio output devices 408A-408G to gradually reduce a volume of a currently playing audio, in case the output of the first 3D audio object 402B by the first set of audio output devices 402A (e.g. the audio output device 408D and the audio output device 408E) is started. The circuitry 202 may further control the second set of output audio devices (such as 408E and 408F) to gradually increase the volume of the currently playing audio (e.g. a music track), in case the output of the first 3D audio object 402B by the first set of audio output devices 402A is completed. For example, the second set of output audio devices (such as 408E and 408F) may output the currently playing audio. The circuitry 202 may control the second set of output audio devices (such as 408E and 408F) to gradually reduce the volume of the currently playing audio, such that the first 3D audio object 402B may be clearly audible to the driver of the first vehicle 402. The circuitry 202 may further control the second set of output audio devices to gradually increase the volume of the currently playing audio, in case the output of the first 3D audio object 402B is completed. Therefore, the control of the volume of the currently playing audio by the circuitry 202 may alert the driver about the presence of the approaching first object 404, without significantly interrupting the playback of the currently playing audio in the first vehicle 402. It may be noted that the control of the volume of the currently playing audio, is merely an example, and the circuitry 202 may control other parameters (such as, frequency, direction, tone, equalization, etc.) of the currently playing audio output by the second set of output audio devices based on a reproduction timing (such as start or completion) of the first 3D audio object 402B, without departing from scope of the disclosure.

Figure 5A:
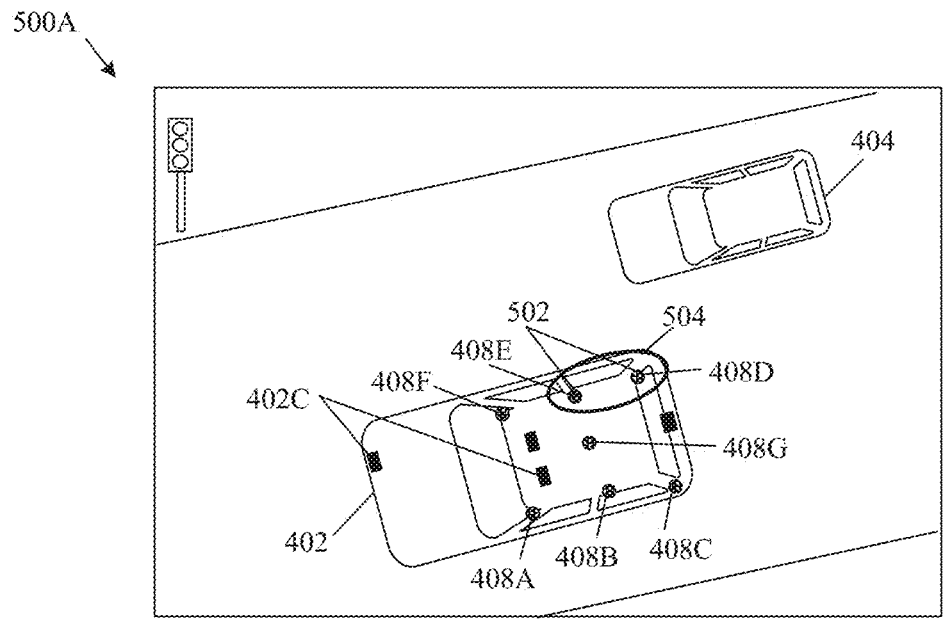
FIGS. 5A and 5B are diagrams that collectively illustrate exemplary scenarios for control of a plurality of audio output devices to output a first 3D object, based on change in position of a first object with respect to the first vehicle, in accordance with an embodiment of the disclosure.
Figure 5B:
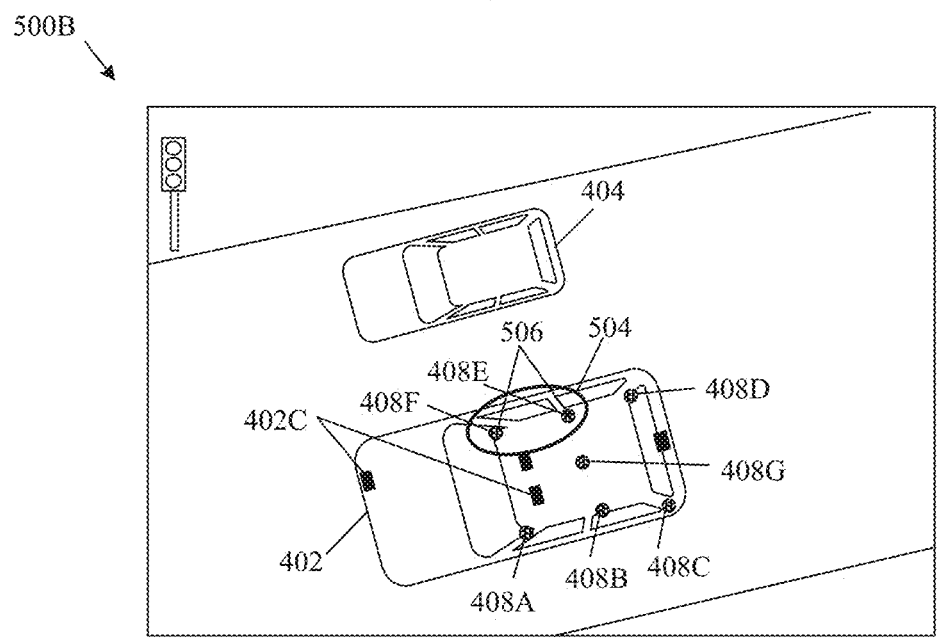

FIGS. 5A and 5B are diagrams that collectively illustrate exemplary scenarios for control of a plurality of audio output devices to output a first 3D object, based on change in position of a first object with respect to the first vehicle, in accordance with an embodiment of the disclosure. FIGS. 5A and 5B are described in conjunction with elements from FIGS. 1, 2, 3, and 4. With reference to FIG. 5A, there is shown a scenario 500A. In the scenario 500A, there is shown a first vehicle 402 and a first object 404. The first object 404 may be at a first position with respect to the first vehicle 402 at a first time instant.

In accordance with an embodiment, in case the type of the first object 404 is the moving object (such as a moving vehicle), the circuitry 202 may be further configured to determine a speed of movement of the first object 404 based on a change in the position (such as from the first position to a second position) of the first object 404 with respect to the first vehicle 402. In some embodiments, the speed of movement of the first object 404 may be detected based on the signals from the plurality of sensors 302A-302D (e.g. image sensor, or RADAR or LiDAR sensors). For example, based on an analysis of change in pixel information of captured images (i.e. the signals) of the first object 404, circuitry 202 may determine the speed of the first object 404. In other embodiments, in case the first vehicle 402 is moving, the speed of movement of the first object 404 may be determined based on the speed of the first vehicle 402 (obtained from the ECU or a speed sensor of the first vehicle 402) and based on the change in position of the first object 404 relative to the first vehicle 402 in unit time. The circuitry 202 may generate the metadata 204A associated with the first object 404 based on the determined speed. The circuitry 202 may be configured to control a first set of audio output devices 502 (which may correspond to an audio output device 408D and an audio output device 408E) of the plurality of audio output devices 408A-408G to output the first 3D audio object 504, in the 3D space 306 of the first vehicle 402 as described, for example, in FIG. 4.

In one or more embodiments, a volume of the first 3D audio object 504 output by the first set of audio output devices 502 may depend on the speed of the first object 404 and the distance between the first object 404 and the first vehicle 402. For example, the volume of the first 3D audio object 504 may increase as the distance between the first object 404 and the first vehicle 402 decreases. The position of the virtual sound source corresponding to the first 3D audio object 504 at the first time instant may be dependent on the relative position of the first object 404 with respect to the first vehicle 402. Therefore, the first set of audio output devices 502 may be controlled to output the first 3D audio object 504 as the virtual sound source at the first time instant. Thus, the driver of the first vehicle 402 may aurally and intuitively recognize the position of the first object 404 which may be approaching the first vehicle 402 at a higher speed than the first vehicle 402.

With reference to FIG. 5B, there is shown a scenario 500B. In the scenario 500B, there is shown the first vehicle 402 and the first object 404 at a second position. The first object 404 may be at the second position with respect to the first vehicle 402 at a second time instant based on the movement of the first object 404 at a higher speed than the first vehicle 402. In accordance with an embodiment, the circuitry 202 may be configured to switch from the first set of audio output devices 502 to a second set of audio output devices 506 (which may correspond to the audio output device 408E and an audio output device 408F) of the plurality of audio output devices 408A-408G to output the first 3D audio object 504 generated based on the detected first object 404. The switch causes the position and a volume of the virtual sound source (corresponding to the first 3D audio object 504) to continuously change in the 3D space of the first vehicle 402. The position and the volume of the virtual sound source corresponding to the first 3D audio object 504 may be changed based on the change in the position of the first object 404 with respect to the first vehicle 402. For example, the first 3D audio object 504 may be output by the second set of audio output devices 506, when the position of the first object 404 is changed from the first position (which may be rear right side of the first vehicle 402 shown in FIG. 5A) to the second position (which may be a front right side of the first vehicle 402 shown in FIG. 5B). In an example, the circuitry 202 may control the plurality of audio output devices 408A-408G such that position of the virtual sound source corresponding to first 3D audio object 504 may gradually shift from the audio output device 408D to the audio output device 408E and then to the audio output device 408F, based on the changing position of the first object 404 with respect of the first vehicle 402. Thus, the circuitry 202 may control the plurality of audio output devices 408A-408G such that position of the virtual sound source corresponding to the first 3D audio object 504 matches the position of the first object 404 with respect of the first vehicle 402.

Figure 6A:
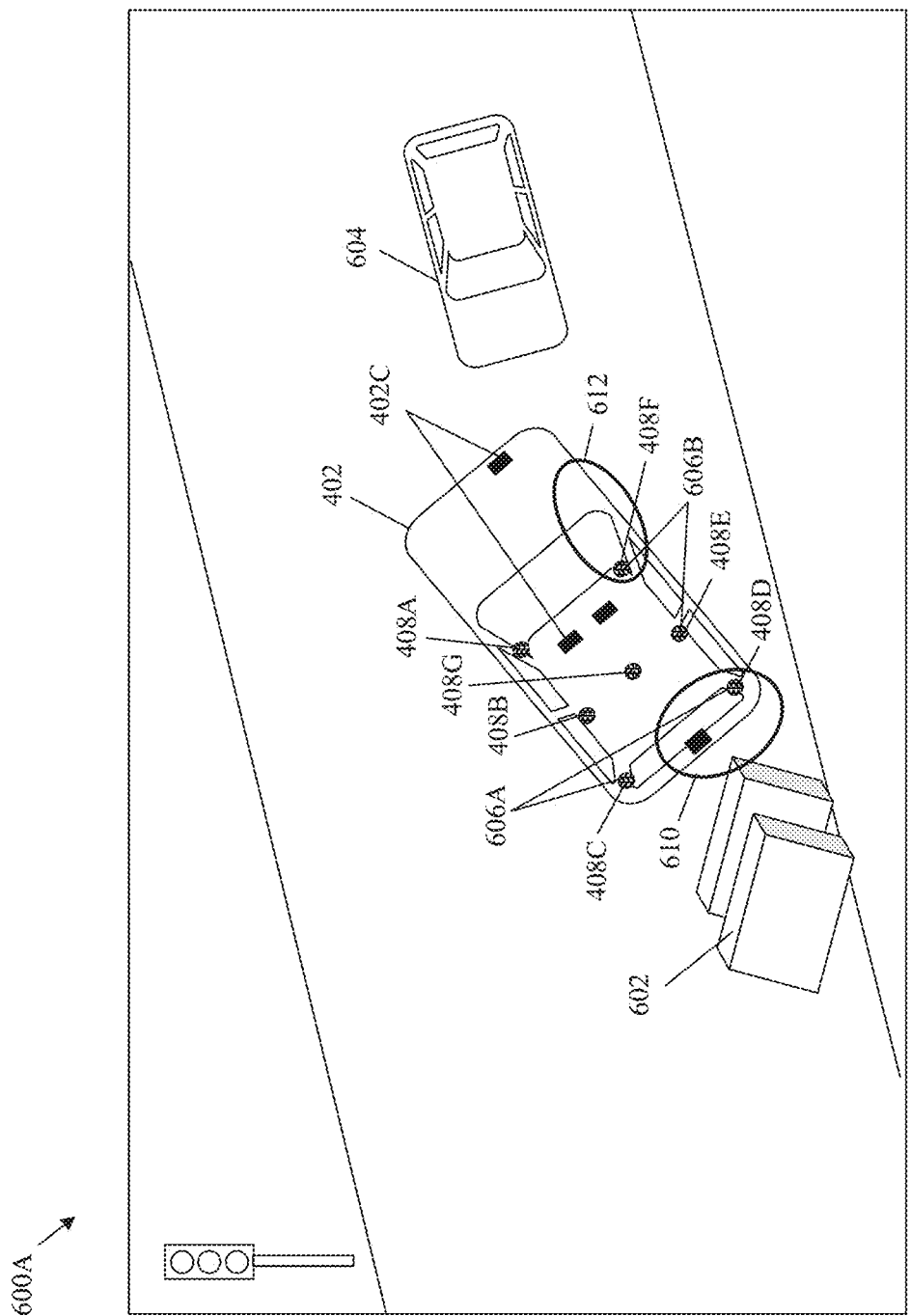
FIG. 6A is a diagram that illustrates an exemplary scenario for sequential output of a first 3D audio object associated with a first object and a second 3D audio object associated with a second object, in accordance with an embodiment of the disclosure.

FIG. 6A is a diagram that illustrates an exemplary scenario for sequential output of a first 3D audio object associated with a first object and a second 3D audio object associated with a second object, in accordance with an embodiment of the disclosure. FIG. 6A is described in conjunction with elements from FIGS. 1, 2, 3, 4, 5A, and 5B. With reference to FIG. 6A, there is shown a scenario 600A. In the scenario 600A, there is shown the first vehicle 402, a first object 602, and a second object 604.

In the scenario 600A, for example, the first vehicle 402 may be operated by the driver of the first vehicle 402 to park the first vehicle 402. The circuitry 202 may be configured to detect the type of the first object 602 in a vicinity of the first vehicle 402, such as towards the rear end of the first vehicle 402 based on the signals (such as images of the first object 602 captured by the plurality of sensors 302A-302D shown in FIG. 3). The circuitry 202 may be configured to generate the metadata 204A associated with the first object 602, based on the detected type (e.g. boxes) of the first object 602 and the position (e.g. 1 feet from the rear bumper) of the first object 602 with respect to the first vehicle 402, as described for example in FIG. 4. The metadata 204A may include a first 3D audio object 610 and information associated with the first object 602. For example, the first object 602 may be a pile of boxes at a blind spot of the driver of the first vehicle 402, such as, the rear end of the first vehicle 402, which may not be visible to the driver of the first vehicle 402.

In accordance with an embodiment, the circuitry 202 may be further configured to detect a presence of the second object 604 in the vicinity of the first vehicle 402. The circuitry 202 may detect the type of the second object 604 and the position of the second object 604 with respect to the first vehicle 402. For example, the second object 604 may be a stationary car parked near the front end of the first vehicle 402. The circuitry 202 may generate the metadata 204A based on the detection of the type (e.g. car) of the second object 604 and the position (e.g. 3 feet from the front bumper) of the second object 604 with respect to the first vehicle 402. The metadata 204A may further include a second 3D audio object 612 indicating the information about the second object 604 as described, for example, in FIG. 4.

The circuitry 202 may further control the plurality of audio output devices 408A-408G to sequentially output the first 3D audio object 610 at the first time instant and the second 3D audio object 612 at a second time instant, based on a time synchronization between the first 3D audio object 610 and the second 3D audio object 612. For example, the circuitry 202 may control a first set of audio output devices 606A (which may include an audio output device 408C and the audio output device 408D) of the plurality of audio output devices 408A-408G to output the first 3D audio object 610 at the first time instant and the circuitry 202 may control a second set of audio output devices 606B (which may include the audio output device 408E and the audio output device 408F) of the plurality of audio output devices 408A-408G to output the second 3D audio object 612 at the second time instant. The time synchronization between the first 3D audio object 610 and the second 3D audio object 612 may allow the driver of the first vehicle 402 to clearly hear notifications related to each of the first object 602 and of the second object 604 one at a time.

In an embodiment, the time synchronization between the first 3D audio object 610 and the second 3D audio object 612 may be based on the respective distances of the first object 602 and the second object 604 from the first vehicle 402. For example, the plurality of audio output devices 408A-408G may be controlled to output the first 3D audio object 610 prior to the output of the second 3D audio object 612, since the first object 602 is closer to the first vehicle 402. In another embodiment, the time synchronization between the first 3D audio object 610 and the second 3D audio object 612 may be based on the moving direction of the first vehicle, irrespective of the respective distances of the first object 602 and the second object 604 from the first vehicle 402. The circuitry 202 may determine the moving direction of the first vehicle 402 based on the data (such as position of the gearshift, rotational angle of the steering wheel, geo-location of the first vehicle 402, etc.) obtained from the ECU of the first vehicle 402. For example, the plurality of audio output devices 408A-408G may be controlled to output the second 3D audio object 612 before the first 3D audio object 610 is output in case the first vehicle 402 is moving towards the second object 604.

In an exemplary embodiment, the first 3D audio object 610 and the second 3D audio object 612 may be output as the verbal notification based on detection that the type of the detected first object 602 and the second object 604 are stationary objects. For example, the verbal notification corresponding to the first 3D audio object 610 may comprise a synthesized speech sound, such as "boxes located 1 feet from the rear bumper". Thus, the verbal notification may include the type (i.e. boxes) of the first object 602, the distance (i.e. 1 feet) between the first object 602 and the first vehicle 402 and the position (i.e. rear) of the first object 602 with respect to the first vehicle 402. Similarly, the verbal notification corresponding to the second 3D audio object 612 may comprise a synthesized speech sound, such as "car located 3 feet from the front bumper". The circuitry 202 may control the plurality of audio output devices 408A-408G to output the meaningful notifications in the form of verbal notifications, which may allow the driver of the first vehicle 402 to easily understand the type, the distance, and the position of the obstacles (such as the first object 602 and the second object 604) with respect to the first vehicle 402.

In accordance with an embodiment, the circuitry 202 may be further configured to determine a priority for the output of the first 3D audio object and the second 3D audio object based on at least one of the detected type of the first object 602 and the detected type of the second object 604, a proximity of each of the position of the first object 602 and the position of the second object 604 with respect to the first vehicle 402, a speed of movement of each of the first object 602 and the second object 604, a size of each of the first object 602 and the second object 604, or a side of the first vehicle 402 (e.g. driver side or passenger side) on which each of the first object 602 and the second object 604 is located.

In an exemplary embodiment, the circuitry 202 may assign a higher priority to the first object 602 based on the determination that the first object 602 is closer to the first vehicle 402 compared to the second object 604. In such a case, the first 3D audio object 610 may be output at the first time instant before the second 3D audio object 612 is output at the second time instant, based on the determination that the first object 602 is closer to the first vehicle 402 compared to the second object 604. In another example, the second object 604 (such as the car) may start moving towards the first vehicle 402, in which case, the second 3D audio object 612 corresponding to the second object 604 may be output at the first time instant before the first 3D audio object 610 is output at the second time instant. In another example, a pedestrian (as a type of first object) may be given higher priority than a pile of boxes, and the circuitry 202 may control the plurality of audio output devices 408A-408G to output a sound alert or a verbal notification corresponding to the pedestrian before a sound alert or a verbal notification corresponding to the pile of boxes is output.

Figure 6B:
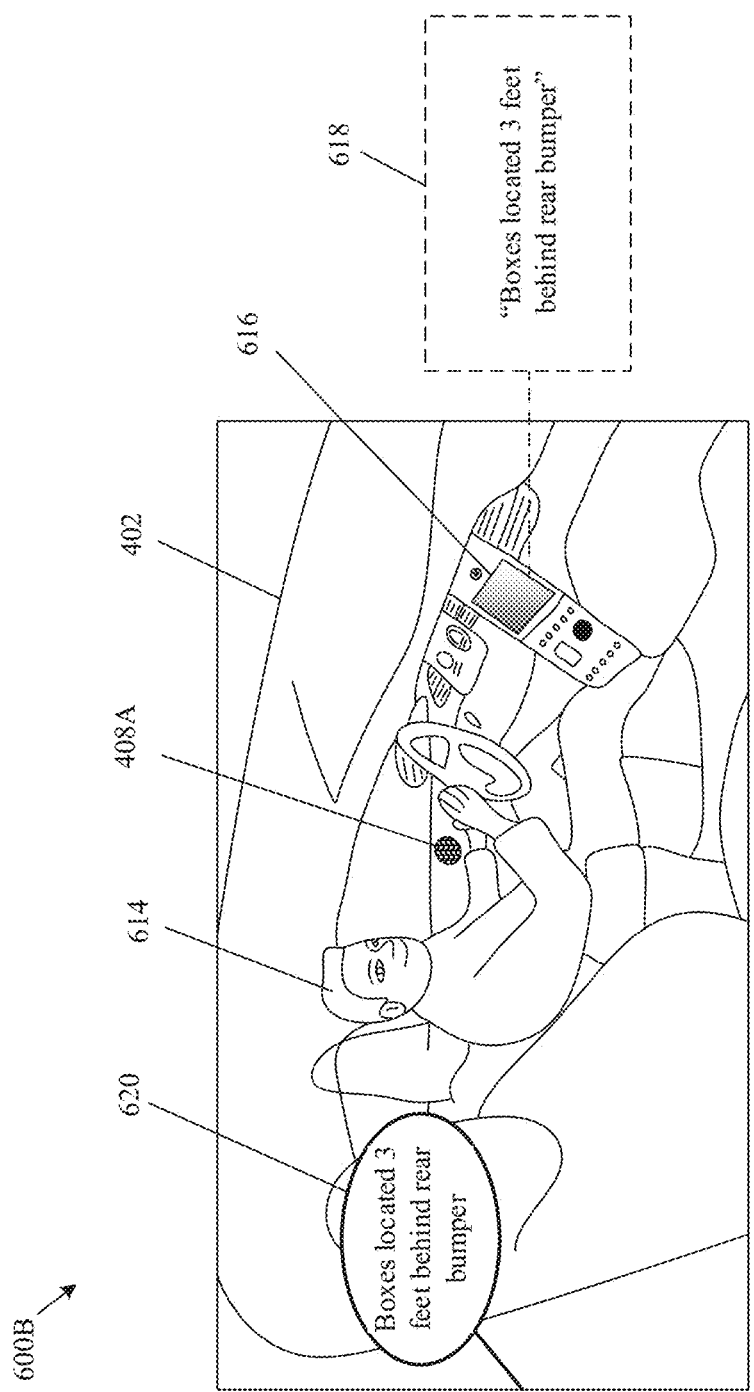
FIG. 6B is a diagram that illustrates an exemplary scenario for generation and output of a textual notification and a verbal notification associated with a first object, in accordance with an embodiment of the disclosure.

FIG. 6B is a diagram that illustrates an exemplary scenario for generation and output of a textual notification and a verbal notification associated with a first object, in accordance with an embodiment of the disclosure. FIG. 6B is described in conjunction with elements from FIGS. 1, 2, 3, 4, 5A, 5B, and 6A. With reference to FIG. 6B, there is shown a scenario 600B. In the scenario 600B, there is shown the first vehicle 402, a driver 614 of the first vehicle 402, and a display device 616.

In accordance with an embodiment, the circuitry 202 may be configured to generate a textual notification 618 based on the detected type of the first object 602 (shown in FIG. 6A) and the position of the first object 602 with respect to the first vehicle 402. The textual notification 618 may correspond to a verbal notification 620. The circuitry 202 may generate the metadata 204A which may include the textual notification 618, based on the detection of the first object 602 (which may be the stationary object). The circuitry 202 may control the display device 616 associated with one of the first vehicle 402 or the electronic device 110 associated with the driver 614 of the first vehicle 402 to display the generated textual notification 618.

In an exemplary embodiment, the verbal notification 620 may comprise a synthesized speech sound such as "boxes located 3 feet behind the rear bumper", based on the detection of the type, the distance, and the position of the first object 602 with respect to the first vehicle 402. The circuitry 202 may be configured to generate and output the textual notification 618 ("boxes located 3 feet behind the rear bumper") corresponding to the verbal notification 620 for display on the display device 616. Concurrent to the display of the textual notification on the display device 616, the circuitry 202 may control the first set of audio output devices 606A to output the first 3D audio object as the verbal notification 620.

In accordance with an embodiment, the circuitry 202 may be further configured to receive a user input from the electronic device 110 (such as mobile phone) associated with the driver 614 of the first vehicle 402. In an exemplary embodiment, the driver 614 may provide the user input via an application installed on the electronic device 110 associated with the driver 614. The user input may correspond to a selection of a type of the sound alert among a plurality of types of sound alerts for each type of the first object 602. For example, the plurality of types of sound alerts may include, but are not limited to, the artificial engine sound, the artificial rumble sound, the vehicle horn sound, or the nature sound. The user input may correspond to a selection of the "artificial engine sound when the type of object detected is a vehicle". In another example, the user input may correspond to a selection of the "artificial rumble sound when a change of lane is detected", and the type of object detected is a rumble strip or a painted strip. Thus, the circuitry 202 may control the plurality of audio output devices 408A-408G to output the first 3D audio object as "artificial rumble sound", when the change of lane is detected. Details of the lane change by the first vehicle 402 are further described for example, in FIG. 7.

Figure 7:
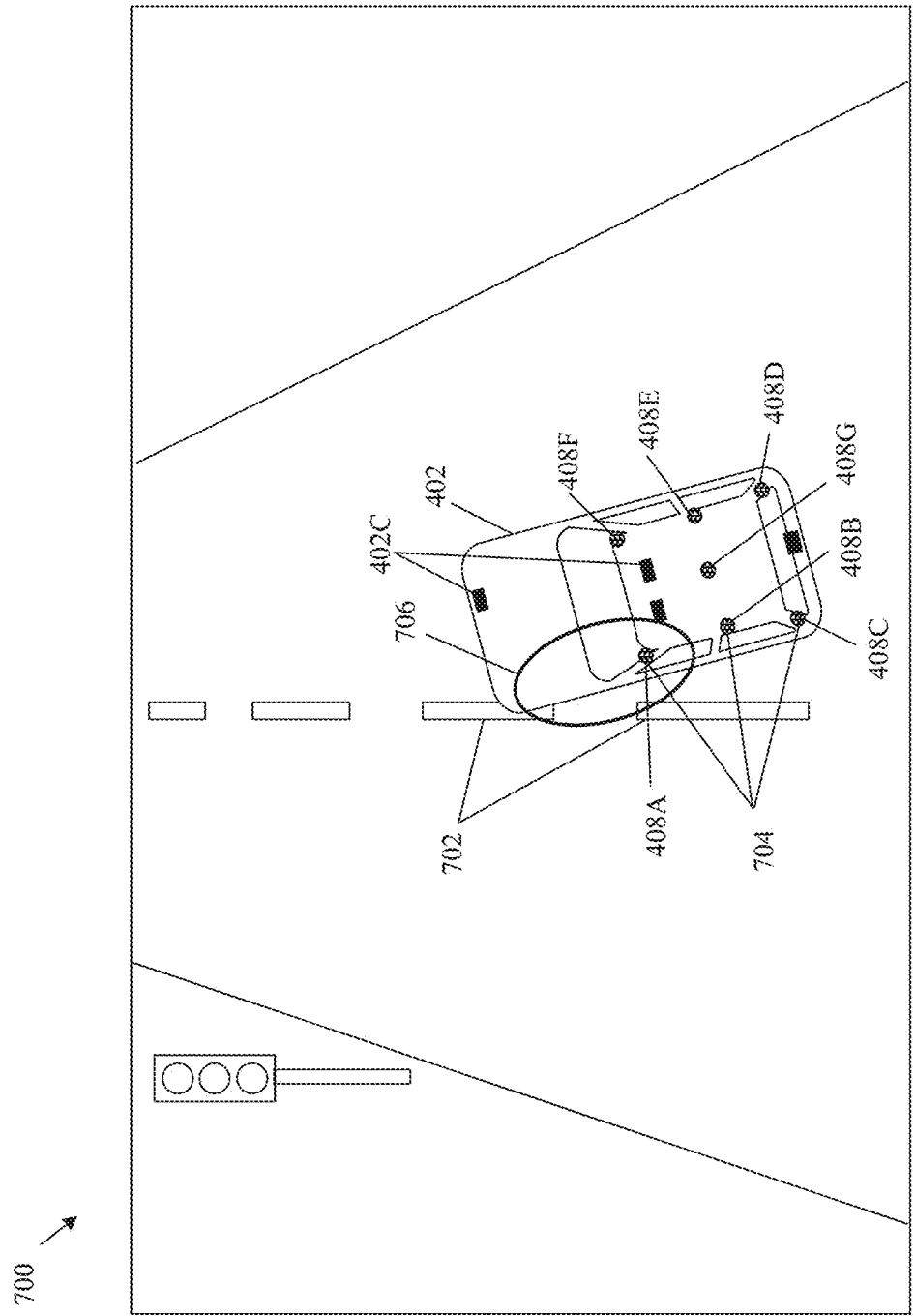
FIG. 7 is a diagram that illustrates an exemplary scenario for the generation and notification of the 3D audio, associated with a lane change, for the first vehicle, in accordance with an embodiment of the disclosure.

FIG. 7 is a diagram that illustrates an exemplary scenario for the generation and notification of the 3D audio, associated with a lane change, for the first vehicle, in accordance with an embodiment of the disclosure. FIG. 7 is described in conjunction with elements from FIGS. 1, 2, 3, 4, 5A, 5B, 6A, and 6B. With reference to FIG. 7, there is shown a scenario 700. In the scenario 700, there is shown the first vehicle 402 and a lane strip 702.

The circuitry 202 may be configured to detect the type of object as the lane strip 702 which may be painted on the road, as shown in FIG. 7. The circuitry 202 may detect that the first vehicle 402 may be swaying to another lane (e.g. a left side lane) or to the wrong side of the road while moving over the lane strip 702. Therefore, the circuitry 202 may control a set of audio output devices 704 located on the left hand side of the first vehicle 402 to output a 3D audio object 706. The set of audio output devices 704 may include the audio output device 408A, an audio output device 408B, and an audio output device 408C. The set of audio output devices 704 may further include one or more audio output devices (not shown) located at the bottom of the first vehicle 402 in the interior of the first vehicle 402.

In some embodiments, the circuitry 202 may control the set of audio output devices 704 to output the 3D audio object 706 as a sound alert which may correspond to an artificial rumble sound, based on the detected type of the object as the lane strip 702. The artificial rumble sound output by the set of audio output devices 704 may simulate driving over an actual rumble strip to aurally alert the driver of the first vehicle 402. In another embodiment, the circuitry 202 may output the 3D audio object 706 as a verbal notification. In an example, the verbal notification may comprise a synthesized speech sound, such as, "please stay in your lane". Thus, the circuitry 202 may intuitively and aurally alert the driver 614 of the first vehicle 402 that the first vehicle 402 may be departing to another lane or on the wrong side of the road, based on the generated meaningful 3D audio notifications. In some embodiments, the circuitry 202 may be configured to control the set of audio output devices 704 located on the side of the lane departure to lower the volume of a currently playing audio (e.g. a music track), and output the 3D audio object 706 as an artificial rumble sound originating from a floor area of the first vehicle 402 on the side of lane departure, which may further allow the driver to recognize the direction in which the first vehicle 402 has deviated.

In accordance with an embodiment, the circuitry 202 may be further configured to determine one of an operation of the first vehicle 402 or a gesture of the driver of the first vehicle 402. The operation may include, for example, activation of an indicator light of the first vehicle 402 by the driver. The circuitry 202 may determine the activation of the indicator light based on data obtained from the ECU of the first vehicle 402. The operation of the first vehicle 402 may indicate the intent of the driver to change lanes or to turn left or right. The gesture may include, for example, opening the door of the first vehicle 402 when the first vehicle 402 is stationary. In an example, the circuitry 202 may detect the gesture of the driver based on images captured from an interior camera (not shown) of the first vehicle 402. The circuitry 202 may determine a priority for the output of the first 3D audio object and the second 3D audio object based on the one of the operation of the first vehicle 402 or the gesture of the driver of the first vehicle 402.

In an exemplary embodiment, a left side indicator of the first vehicle 402 may be activated by the driver of the first vehicle 402. The circuitry 202 may control the plurality of audio output devices 408A-408G to prioritize output of the first 3D audio object corresponding to an object (such as a vehicle) on the left hand side of the first vehicle 402 before the output of the second 3D object corresponding to another object (such as another vehicle) on the right hand side of the first vehicle 402, based on the activation of the left side indicator of the first vehicle 402. In another example, the circuitry 202 may control the plurality of audio output devices 408A-408G to output a 3D audio object, to alert the driver of the first vehicle 402 about an approaching vehicle or pedestrian, when the driver performs the gesture of opening a door of the first vehicle 402 to step out of the first vehicle 402.

Figure 8:
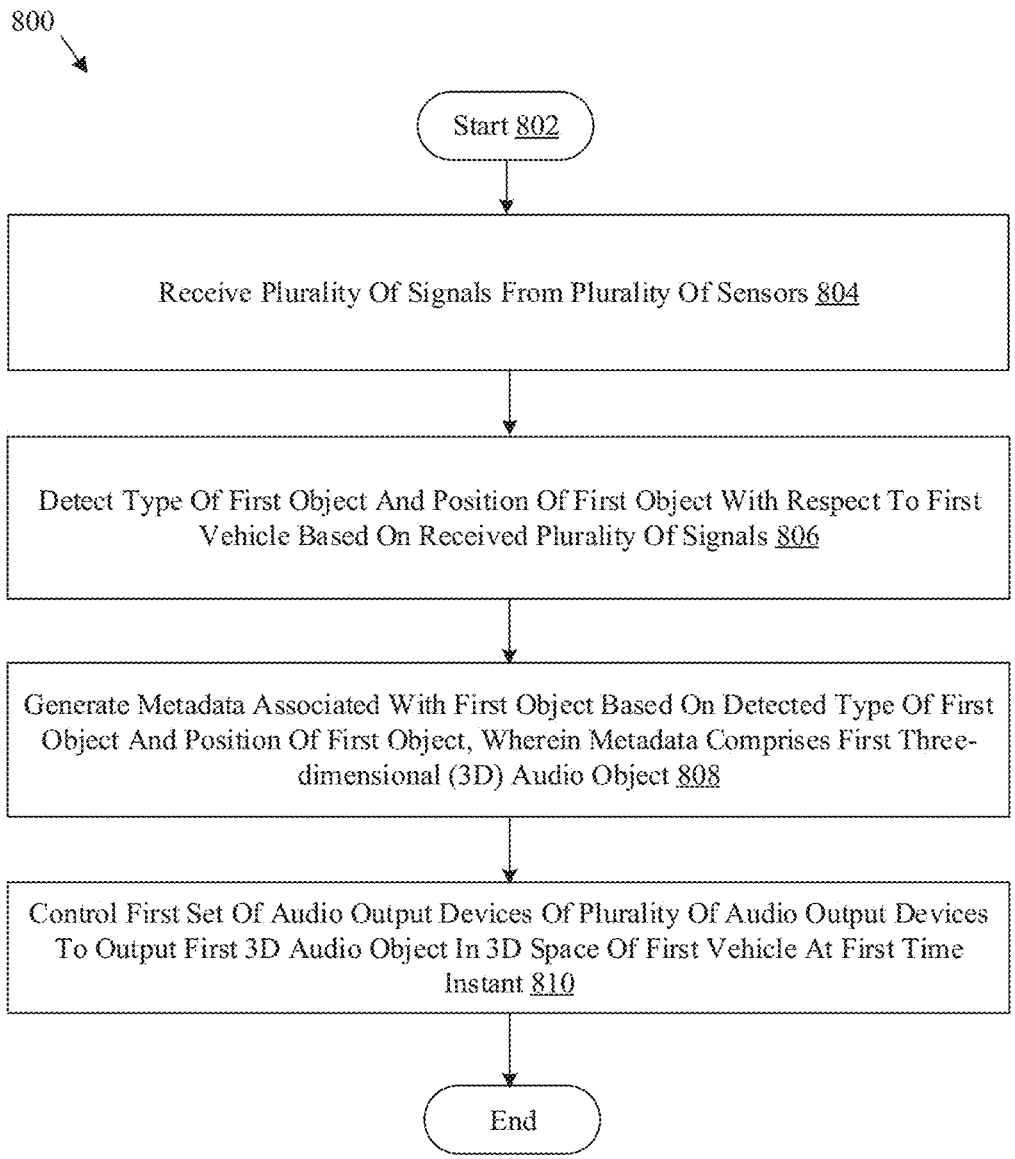
FIG. 8 is a flowchart that illustrates an exemplary method for generation and notification of the 3D audio for the first vehicle, in accordance with an embodiment of the disclosure.

FIG. 8 is a flowchart that illustrates an exemplary method for generation and notification of the 3D audio for the first vehicle, in accordance with an embodiment of the disclosure. FIG. 8 is described in conjunction with elements from FIGS. 1, 2, 3, 4, 5A, 5B, 6A, 6B, and 7. With reference to FIG. 8, there is shown a flowchart 800. The exemplary method of the flowchart 800 may be executed by any computing system, for example, by the control system 112 of FIG. 1 or the circuitry 202 in FIG. 2. The exemplary method of the flowchart 800 may start at 802 and proceed to 804.

At 804, a plurality of signals may be received from the plurality of sensors 114. In accordance with an embodiment, the circuitry 202 may be configured to receive the plurality of signals from the plurality of sensors 114. The plurality of sensors 114 may be positioned at different positions on the first vehicle 402. Details of the reception of the plurality of signals are described, for example, in FIG. 3.

At 806, the type of the first object 404 and the position of the first object 404 with respect to the first vehicle 402 may be detected. In accordance with an embodiment, the circuitry 202 may be configured to detect the type of the first object 404 and the position of the first object 404 with respect to the first vehicle 402. The type of the first object 404 may be a stationary object or a moving object. Details of the detection of the type of the first object 404 and the position of the first object 404 with respect to the first vehicle 402 are described, for example, in FIG. 4.

At 808, metadata 204A associated with the first object 404 may be generated. In accordance with an embodiment, the circuitry 202 may be configured to generate the metadata 204A associated with the first object 404 based on the detected type of the first object 404 and the position of the first object 404. The metadata 204A may include a first 3D audio object (such as the first 3D audio object 402B). Details of the generation of the metadata 204A are described, for example, in FIG. 4.

At 810, the first set of audio output devices 402A of the plurality of audio output devices 408A-408G may be controlled to output the first 3D audio object in the 3D space (such as the 3D space 118) of the first vehicle 402 at the first time instant. In accordance with an embodiment, the circuitry 202 may be configured to control the first set of audio output devices 402A of the plurality of audio output devices 408A-408G, to output the first 3D audio object in the 3D space 118 of the first vehicle 402. Details of the control of the first set of audio output devices 402A to output the first 3D audio object are described, for example, in FIG. 4. Control may pass to end.

Although the flowchart 800 illustrates discrete operations, such as 804, 806, 808 and 810 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer (for example, the control system 112). The instructions may cause the machine and/or computer (for example, the control system 112) to perform operations for the generation and notification of three-dimensional (3D) audio for a vehicle (such as the first vehicle 104 or 402). The operations may include reception of a plurality of signals from a plurality of sensors (such as the plurality of sensors 114). The operations may further include detection of a type of a first object (such as the first object 404) and a position of the first object 404 with respect to the first vehicle 402 based on the received plurality of signals. The operations may further include generation of metadata (such as the metadata 204A) associated with the first object 404 based on the detected type of the first object 404 and the position of the first object 404. The metadata 204A may include a first 3D audio object (such as the first 3D audio object 402B). The operations may further include control of a first set of audio output devices (such as the first set of audio output devices 402A) of a plurality of audio output devices (such as the plurality of audio output devices 304A-304G) to output the first 3D audio object in a 3D space (such as the 3D space 118) of the first vehicle 402 at a first time instant.

Exemplary aspects of the disclosure may include a system (such as the control system 112 in a first vehicle (such as the first vehicle 104 or 402). The control system 112 may include circuitry (such as the circuitry 202) communicatively coupled to a plurality of sensors (such as the plurality of sensors 114) and a plurality of audio output devices (such as the plurality of audio output devices 116). The circuitry 202 may be configured to receive a plurality of signals from the plurality of sensors 114. The circuitry 202 may be further configured to detect of a type of a first object (such as the first object 404) and a position of the first object 404 with respect to the first vehicle 402 based on the received plurality of signals. The circuitry 202 may be further configured to generate metadata (such as the metadata 204A) associated with the first object 404 based on the detected type of the first object 404 and the position of the first object 404. The metadata 204A may include a first 3D audio object (such as the first 3D audio object 402B). The circuitry 202 may be further configured to control a first set of audio output devices (such as the first set of audio output devices 402A) of a plurality of audio output devices (such as the plurality of audio output devices 304A-304G) to output the first 3D audio object 402B in a 3D space (such as the 3D space 118) of the first vehicle 402 at a first time instant.

In accordance with an embodiment, the circuitry 202 may be further configured to output the first 3D audio object 402B as at least one of a sound alert or a verbal notification (such as the verbal notification 620).

In accordance with an embodiment, the circuitry 202 may be further configured to generate a textual notification (such as the textual notification 618) based on the detected type of the first object 602 and the position of the first object 602 with respect to the first vehicle 402. The textual notification 618 may correspond to the verbal notification 620. The circuitry 202 may further control a display device (such as the display device 616) associated with one of the first vehicle 402 or an electronic device (such as the electronic device 110) associated with a driver (such as the driver 614) of the first vehicle 402 to display the generated textual notification 618 at the first time instant.

In accordance with an embodiment, the information associated with the first object 602 may include at least one of the detected type of the first object 602, a direction of the position of the first object 602 with respect to the first vehicle 402, a distance of the first object 602 from the first vehicle 402, a size of the first object 602, or a side of the first vehicle 402 on which the first object 602 is located. The verbal notification 620 may indicate the information associated with the first object 602.

In accordance with an embodiment, the sound alert may correspond to at least one of an engine sound, an artificial rumble sound, a vehicle horn sound, or a nature sound. The verbal notification 620 may correspond to a synthesized speech sound.

In accordance with an embodiment, the circuitry 202 may be further configured to receive a user input from the electronic device 110 associated with the driver 614 of the first vehicle 402. The user input may correspond to a selection of a type of the sound alert among a plurality of types of sound alerts for each type of the first object 602.

In accordance with an embodiment, the circuitry 202 may be further configured to control the first set of audio output devices 502 to output the first 3D audio object 402B as a virtual sound source in the 3D space 118. The circuitry 202 may further switch from the first set of audio output devices 502 to a second set of audio output devices (such as the second set of audio output devices 506) of the plurality of audio output devices 408A-408G to continuously change a position and volume of the virtual sound source in the 3D space 118. The position and the volume of the virtual sound source may be changed based on a change in the position of the first object 404 with respect to the first vehicle 402.

In accordance with an embodiment, the 3D space 118 may include at least one of an interior space of the first vehicle 402 or a space between the first vehicle 402 and the first object 404. The circuitry 202 may be further configured to control the position of the virtual sound source to correspond to one of the interior space of the first vehicle 402 or the space between the first vehicle 402 and the first object 404.

In accordance with an embodiment, the circuitry 202 may be further configured to detect presence of a second object (such as the second object 604) in a vicinity of the first vehicle 402. The circuitry 202 may further detect a type of the second object 604 and a position of the second object 604 with respect to the first vehicle 402. The circuitry 202 may further generate the metadata 204A based on the detection of the type of the second object 604 and the position of the second object 604 with respect to the first vehicle 402. The metadata 204A may further include a second 3D audio object (such as the second 3D audio object 612). The circuitry 202 may further control the plurality of audio output devices 408A-408G to sequentially output the first 3D audio object at the first time instant and the second 3D audio object 612 at a second time instant, based on a time synchronization between the first 3D audio object (such as the first 3D audio object 610) and the second 3D audio object 612.

In accordance with an embodiment, the circuitry 202 may be further configured to determine a priority for the output of the first 3D audio object 610 and the second 3D audio object 612 based on at least one of the detected type of the first object 602 and the detected type of the second object 604, a proximity of each of the position of the first object 602 and the position of the second object 604 with respect to the first vehicle 402, a speed of movement of each of the first object 602 and the second object 604, a size of each of the first object 602 and the second object 604, or a side of the first vehicle 402 on which each of the first object 602 and the second object 604 is located.

In accordance with an embodiment, the circuitry 202 may be further configured to determine one of an operation of the first vehicle 402 or a gesture of the driver 614 of the first vehicle 402. The circuitry 202 may further determine a priority for the output of the first 3D audio object 610 and the second 3D audio object 612 based on the one of the operation of the first vehicle 402 or the gesture of the driver 614 of the first vehicle 402.

In accordance with an embodiment, the circuitry 202 may be further configured to control a second set of output audio devices (such as 408E and 408F) of the plurality of audio output devices 408A-408G to gradually reduce a volume of a currently playing audio, in case the output of the first 3D audio object 402B by the first set of output audio devices is started. The circuitry 202 may further control the second set of output audio devices to gradually increase the volume of the currently playing audio, in case the output of the first 3D audio object 402B by the first set of output audio devices is completed.

In accordance with an embodiment, the plurality of sensors 302A-302D may be positioned at different positions on the first vehicle 300. The plurality of sensors 302A-302D may include at least one of an image sensor, a light detection and ranging sensor, or an audio sensor.

In accordance with an embodiment, the type of the first object 404 is one of a stationary object or a moving object. The circuitry 202 may be further configured to control the plurality of audio output devices 408A-408G to output the first 3D audio object 402B as a verbal notification 620 in case the type of the first object 602 is the stationary object. The circuitry 202 may output the first 3D audio object 402B as a sound alert in case the type of the first object 602 is the moving object.

In accordance with an embodiment, in case the type of the first object 404 is the moving object, the circuitry 202 may be further configured to determine a speed of movement of the first object 404 based on a change in the position of the first object 404 with respect to the first vehicle 402. The circuitry 202 may generate the metadata 204A associated with the first object 404 based on the determined speed.

In accordance with an embodiment, the type of the first object 106 may include one of a second vehicle (such as the second object 604), a rumble strip (such as the lane strip 702), a median, a pedestrian, or an obstacle. The circuitry 202 may be further configured to control a sound of the first 3D audio object 402B based on the detected type of the first object 106.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A system, comprising:
   circuitry communicatively coupled to a plurality of sensors and a plurality of audio output devices, wherein the circuitry is configured to:
   receive a plurality of signals from the plurality of sensors;
   detect a type of a first object and a position of the first object with respect to a first vehicle based on the received plurality of signals;
   generate metadata associated with the first object based on the detected type of the first object and the position of the first object, wherein
   the metadata comprises a first three-dimensional (3D) audio object, and
   the first 3D audio object is at least one of a sound alert or a verbal notification;
   receive a user input from an electronic device associated with a driver of the first vehicle, wherein the user input corresponds to a selection of a type of the sound alert among a plurality of types of sound alerts for each type of the first object; and
   control a first set of audio output devices of the plurality of audio output devices to output the type of the sound alert as the first 3D audio object in a 3D space of the first vehicle at a first time instant.

2. The system according to claim 1, wherein the circuitry is further configured to:
   generate a textual notification based on the detected type of the first object and the position of the first object with respect to the first vehicle, wherein the textual notification corresponds to the verbal notification; and
   control a display device associated with one of the first vehicle or the electronic device associated with the driver of the first vehicle to display the generated textual notification at the first time instant.

3. The system according to claim 1, wherein
   the metadata further comprises information associated with the first object,
   the information associated with the first object comprises at least one of the detected type of the first object, a direction of the position of the first object with respect to the first vehicle, a distance of the first object from the first vehicle, a size of the first object, or a side of the first vehicle on which the first object is located, and
   the verbal notification indicates the information associated with the first object.

4. The system according to claim 1, wherein
   the sound alert corresponds to at least one of: an engine sound, an artificial rumble sound, a vehicle horn sound, or a nature sound, and
   the verbal notification corresponds to a synthesized speech sound.

5. The system according to claim 1, wherein the circuitry is further configured to:
   control the first set of audio output devices to output the first 3D audio object as a virtual sound source in the 3D space; and
   switch from the first set of audio output devices to a second set of audio output devices of the plurality of audio output devices to continuously change a position and volume of the virtual sound source in the 3D space, wherein the position and the volume of the virtual sound source is changed based on a change in the position of the first object with respect to the first vehicle.

6. The system according to claim 5, wherein
   the 3D space comprises at least one of an interior space of the first vehicle or a space between the first vehicle and the first object, and
   the circuitry is further configured to control the position of the virtual sound source to correspond to one of the interior space of the first vehicle or the space between the first vehicle and the first object.

7. The system according to claim 1, wherein the circuitry is further configured to:
   detect presence of a second object in a vicinity of the first vehicle;
   detect a type of the second object and a position of the second object with respect to the first vehicle;
   generate the metadata based on the detection of the type of the second object and the position of the second object with respect to the first vehicle, wherein the metadata further comprises a second 3D audio object; and control the plurality of output audio devices to sequentially output the first 3D audio object at the first time instant and the second 3D audio object at a second time instant, based on a time synchronization between the first 3D audio object and the second 3D audio object.

8. The system according to claim 7, wherein the circuitry is further configured to:
determine a priority for the output of the first 3D audio object and the second 3D audio object based on at least one of: the detected type of the first object and the detected type of the second object, a proximity of each of the position of the first object and the position of the second object with respect to the first vehicle, a speed of movement of each of the first object and the second object, a size of each of the first object and the second object, or a side of the first vehicle on which each of the first object and the second object is located.

9. The system according to claim 7, wherein the circuitry is further configured to:
determine one of an operation of the first vehicle or a gesture of the driver of the first vehicle; and
determine a priority for the output of the first 3D audio object and the second 3D audio object based on the one of the operation of the first vehicle or the gesture of the driver of the first vehicle.

10. The system according to claim 1, wherein the circuitry is further configured to:
control a second set of output audio devices of the plurality of output audio devices to gradually reduce a volume of a currently playing audio, in case the output of the first 3D audio object by the first set of output audio devices is started; and
control the second set of output audio devices to gradually increase the volume of the currently playing audio, in case the output of the first 3D audio object by the first set of output audio devices is completed.

11. The system according to claim 1, wherein
the plurality of sensors is positioned at different positions on the first vehicle, and
the plurality of sensors comprises at least one of: an image sensor, a light detection and ranging sensor, or an audio sensor.

12. The system according to claim 1, wherein
the type of the first object is one of a stationary object or a moving object, and
the circuitry is further configured to control the plurality of output audio devices to:
output the first 3D audio object as the verbal notification in case the type of the first object is the stationary object; and
output the first 3D audio object as the sound alert in case the type of the first object is the moving object.

13. The system according to claim 12, wherein, in case the type of the first object is the moving object, the circuitry is further configured to:
determine a speed of movement of the first object based on a change in the position of the first object with respect to the first vehicle; and
generate the metadata associated with the first object based on the determined speed.

14. The system according to claim 1, wherein
the type of the first object comprises one of a second vehicle, a rumble strip, a median, a pedestrian, or an obstacle, and the circuitry is further configured to control a sound of the first 3D audio object based on the detected type of the first object.

15. A method, comprising:
in a system comprising circuitry communicatively coupled to a plurality of sensors and a plurality of audio output devices:
receiving a plurality of signals from the plurality of sensors;
detecting a type of a first object and a position of the first object with respect to a first vehicle based on the received plurality of signals;
generating metadata associated with the first object based on the detected type of the first object and the position of the first object, wherein
the metadata comprises a first three-dimensional (3D) audio object, and
the first 3D audio object is at least one of a sound alert or a verbal notification;
receiving a user input from an electronic device associated with a driver of the first vehicle, wherein the user input corresponds to a selection of a type of the sound alert among a plurality of types of sound alerts for each type of the first object; and
controlling a first set of audio output devices of the plurality of audio output devices to output the type of the sound alert as the first 3D audio object in a 3D space of the first vehicle at a first time instant.

16. The method according to claim 15, further comprising:
detecting presence of a second object in a vicinity of the first vehicle;
detecting a type of the second object and a position of the second object with respect to the first vehicle;
generating the metadata based on the detection of the type of the second object and the position of the second object with respect to the first vehicle, wherein the metadata further comprises a second 3D audio object; and
controlling the plurality of output audio devices to sequentially output the first 3D audio object at the first time instant and the second 3D audio object at a second time instant, based on a time synchronization between the first 3D audio object and the second 3D audio object.

17. The method according to claim 16, further comprising determining a priority for the output of the first 3D audio object and the second 3D audio object based on at least one of: the detected type of the first object and the detected type of the second object, a proximity of each of the position of the first object and the position of the second object with respect to the first vehicle, a speed of movement of each of the first object and the second object, a size of each of the first object and the second object, or a side of the first vehicle on which each of the first object and the second object is located.

18. A non-transitory computer-readable medium having stored thereon, computer-executable instructions that when executed by a system communicatively coupled to a plurality of sensors and a plurality of audio output devices, causes the system to execute operations, the operations comprising:
receiving a plurality of signals from the plurality of sensors;
detecting a type of a first object and a position of the first object with respect to a first vehicle based on the received plurality of signals;

generating metadata associated with the first object based on the detected type of the first object and the position of the first object, wherein
 the metadata comprises a first three-dimensional (3D) audio object, and
 the first 3D audio object is at least one of a sound alert or a verbal notification;
receiving a user input from an electronic device associated with a driver of the first vehicle, wherein the user input corresponds to a selection of a type of the sound alert among a plurality of types of sound alerts for each type of the first object; and
controlling a first set of audio output devices of the plurality of audio output devices to output the type of the sound alert as the first 3D audio object in a 3D space of the first vehicle at a first time instant.

19. A system, comprising:
circuitry communicatively coupled to a plurality of sensors and a plurality of audio output devices, wherein the circuitry is configured to:
 receive a plurality of signals from the plurality of sensors;
 detect a type of a first object and a position of the first object with respect to a first vehicle based on the received plurality of signals;
 detect a type of a second object and a position of the second object with respect to the first vehicle based on the received plurality of signals;
 generate first metadata associated with the first object based on the detected type of the first object and the position of the first object, wherein the first metadata comprises a first three-dimensional (3D) audio object;
 generate second metadata associated with the second object based on the detected type of the second object and the position of the second object, wherein the second metadata comprises a second three-dimensional (3D) audio object; and
 control a first set of audio output devices of a plurality of output devices to sequentially output the first 3D audio object in a 3D space of the first vehicle at a first time instant and control a second set of audio output devices of the plurality of output devices to sequentially output the second 3D audio object in the 3D space of the first vehicle at a second time instant based on a time synchronization between the first 3D audio object and the second 3D audio object.

\* \* \* \* \*